(12) United States Patent
Kalverkamp

(10) Patent No.: US 8,191,714 B2
(45) Date of Patent: Jun. 5, 2012

(54) CONVEYING AND SEPARATING DEVICE FOR ROOT CROP AND A METHOD FOR OPERATING THE DEVICE

(75) Inventor: Klemens Kalverkamp, Damme (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 432 days.

(21) Appl. No.: 12/254,029

(22) Filed: Oct. 20, 2008

(65) Prior Publication Data

US 2009/0104953 A1  Apr. 23, 2009

(30) Foreign Application Priority Data

Oct. 19, 2007 (DE) .................. 10 2007 050 090

(51) Int. Cl.
*B07B 1/14* (2006.01)

(52) U.S. Cl. ........ 209/668; 209/667; 209/673; 171/133; 460/132

(58) Field of Classification Search .................. 209/667, 209/668, 669, 673; 460/123, 132; 171/133; 15/3.11, 3.17
See application file for complete search history.

(56) References Cited

U.S. PATENT DOCUMENTS

| | | | | |
|---|---|---|---|---|
| 1,677,838 A | * | 7/1928 | Molin | 209/672 |
| 2,257,352 A | | 2/1940 | Silver | |
| 2,565,559 A | * | 8/1951 | Hurdelbrink | 15/3.11 |
| 2,604,206 A | * | 7/1952 | Armer | 209/669 |
| 2,608,815 A | * | 9/1952 | Graaff | 171/103 |
| 2,976,550 A | * | 3/1961 | Silver et al. | 15/3.11 |
| 3,267,502 A | * | 8/1966 | Wells | 15/3.11 |
| 3,283,895 A | * | 11/1966 | Rollins | 209/669 |
| 3,721,345 A | * | 3/1973 | Brown et al. | 209/669 |
| 3,747,149 A | * | 7/1973 | Tatyanko et al. | 15/3.11 |
| 3,750,211 A | * | 8/1973 | Zaun et al. | 15/3.11 |
| 3,870,627 A | * | 3/1975 | Herkes | 209/3 |
| 3,985,233 A | * | 10/1976 | Sherman | 209/671 |
| 4,120,363 A | * | 10/1978 | Ernst | 171/58 |
| 4,148,398 A | * | 4/1979 | Mustikka | 209/668 |
| 4,197,916 A | * | 4/1980 | Haverdink et al. | 171/58 |
| 4,430,210 A | * | 2/1984 | Tuuha | 209/234 |
| 4,471,876 A | * | 9/1984 | Stevenson et al. | 209/618 |
| 4,538,734 A | * | 9/1985 | Gill | 209/668 |
| 4,821,886 A | * | 4/1989 | Roethig | 209/618 |
| 4,953,712 A | * | 9/1990 | Meester | 209/669 |
| 5,012,933 A | * | 5/1991 | Artiano | 209/671 |
| 5,024,335 A | * | 6/1991 | Lundell | 209/618 |
| 5,051,172 A | * | 9/1991 | Gilmore | 209/672 |
| 5,060,806 A | * | 10/1991 | Savage | 209/668 |
| 5,425,459 A | * | 6/1995 | Ellis et al. | 209/671 |
| 5,480,034 A | * | 1/1996 | Kobayashi | 209/667 |

(Continued)

FOREIGN PATENT DOCUMENTS

DE  36677  11/1965

(Continued)

*Primary Examiner* — Joseph C Rodriguez
(74) *Attorney, Agent, or Firm* — Gudrun E. Huckett

(57) ABSTRACT

A conveying and separating device for root crop has a separating stretch with at least two rotatingly driven separating rollers, wherein the separating stretch receives a harvested material of root crop and admixed parts and wherein the at least two separating rollers transport on a topside of the separating stretch primarily the root crop while the admixed parts are removed in a screening phase through a screening gap between the at least two separating rollers. By a direct forced cleaning action, the at least two separating rollers are kept free at least of admixed parts that can adhere to the at least two separating rollers.

45 Claims, 21 Drawing Sheets

U.S. PATENT DOCUMENTS

| | | | |
|---|---|---|---|
| 5,697,451 A * | 12/1997 | Nicholson | 171/133 |
| 5,740,922 A * | 4/1998 | Williams | 209/668 |
| 5,824,356 A * | 10/1998 | Silver et al. | 426/481 |
| 6,053,330 A * | 4/2000 | Lavoie | 209/668 |
| 6,250,477 B1 * | 6/2001 | Swanink | 209/386 |
| 2006/0021915 A1 * | 2/2006 | Bjornson et al. | 208/424 |
| 2007/0000823 A1 * | 1/2007 | Greenbank et al. | 209/621 |

FOREIGN PATENT DOCUMENTS

| | | |
|---|---|---|
| DE | 1946207 | 2/1966 |
| DE | 2205309 | 8/1973 |
| DE | 8116786 U1 | 10/1982 |
| DE | 214108 | 10/1984 |
| DE | 3636668 | 5/1986 |
| DE | 29803880 | 6/1986 |
| DE | 29915450 | 1/2001 |
| DE | 19947484 | 4/2001 |
| EP | 0673 593 | 9/1995 |
| GB | 1419348 | 12/1975 |
| GB | 1547974 | 7/1979 |
| GB | 2017536 | 10/1979 |

* cited by examiner

CONVEYING AND SEPARATING DEVICE FOR ROOT CROP AND A METHOD FOR OPERATING THE DEVICE

BACKGROUND OF THE INVENTION

The invention relates to a conveying and separating device for root crop comprising a separating stretch receiving a harvested mixture of potatoes, beets, or similar root crop and rocks, clods of soil or like admixed parts, wherein the separating stretch has at least two rotatingly driven separating rollers on which, on the topside, primarily the root crop is conveyed while the admixed parts are removed in a screening phase by means of a screening gap between the separating rollers. The invention further relates to a method for separating root crop, e.g. potatoes or beets, from a harvested mixture with rocks, clods of soil, dirt, and like admixed parts, wherein the mixture is placed onto a separating stretch comprised of at least two rotatingly driven separating rollers, the admixed parts are removed in a screening phase by means of a screening gap between the separating rollers and the root crop is conveyed on the topside of the separating rollers.

Such screening and conveying devices have been known for a long time in agricultural engineering. According to DD 36 677 (1963) a device with two roller tables is provided wherein the rollers have disk-like conveying elements that are arranged staggered to one another and in the screening gap mesh with one another. In a screening and separating device according to DE 19 46 207 (1966), the interacting meshing roller bodies have elliptical disks as conveying elements so that the conveying action can be increased while the separation or screening effect is improved. DE 22 05 309 (1972) and DE 22 39 783 (1972) propose a root crop cleaning device in which two drums rotating in the same direction are provided with oppositely oriented helical guiding ribs; the devices provide improved pulling apart of the harvested mixture as well as a more intensive movement of the crop so that the separation of soil clods and the like admixed parts is improved.

In a potato harvesting machine according to DE 23 12 111 C2 (1974) in the area of two screen conveyor belts a single roller provided with helical projections is arranged with which an improvement of the separating effect in the conveying gap between the two screen conveyor belts is achieved.

According to DE 26 51 206 (1976) a device for cleaning root crop is proposed in which the mixture is fed into the area between two rotating cleaning rollers. These cleaning rollers can be moved as needed in the axial direction and radial direction by appropriate drive means. For removing soil layers adhering to the rollers, a plate-shaped or finger-shaped stripping device is provided that has an additional drive mechanism.

According to DE 28 11 611 C3 (1978) a soil removing device for root crop is proposed in which the separating members are embodied in the form of disk rollers, similar to the devices of DD 36 677 and DE 19 46 207, so that the disks are meshing with one another and are positioned staggered so as to centrally engage the gaps between two neighboring disks of a roller. In addition to the conveying and separating movement, removal of soil from the intermediate spaces is to be achieved by disks that are arranged as tumbling tools. This system is based on a geometric concept that is however impractical. The tumbling disks that are arranged at a slant to the longitudinal axis of the rollers act as adhesion bodies already when the soil that is applied has only a minimal moisture content because soil contacting the tumbling disks causes a cylindrical filling of the open shape so that the entire cleaning stretch will clog and the cleaning effect is extremely reduced; already after a short period of time blockage of the entire system may result.

In a rotational separator according to G 81 16 786.5 (1981) that is also similarly impractical there is also a cleaning action provided for the gaps between the disks of the rotational separator wherein disks each have thicker portions with which areas of the downstream disks or gaps between the disks are to be kept free of deposits. Similar to these thicker portions acting as stripping devices, DD 214 108 (1983) proposes a roller pair provided with a stripping device that engages between the roller pair (similar to the arrangement of DE 26 51 206) is used for cleaning the rollers.

DE 36 36 668 C2 (1986) discloses a method and an arrangement for conveying and cleaning beets wherein the cleaning stretch is also provided with staggered disks mounted on roller bodies, respectively. Cleaning of the system or of the crop is realized in that the crop is repeatedly thrown in the air along the conveying stretch and, in this way, the crop is separated from the admixed parts that reach a minimal height in comparison to the crop. In the area of the meshing disks, soil, haulm, and the like can deposit on the surface of the disks so that the screening action is disadvantageously reduced and complex cleaning phases are required.

According to DE 298 03 880 U1 (1998) a conveying and separating device has roller bodies provided with star wheels wherein these star wheels have fingers with different deformation or displacement capabilities for improving the conveying and separating function. This construction, similar to DE 23 12 111 C2, is provided for separating haulm wherein a haulm picking roller is arranged in the passage between a deflection roller and a screen conveyor belt and blockage of the system is prevented. DE 199 47 484 A1 (1999) discloses a harvesting machine provided with a haulm separating device with several conveying rollers that are moveable in a direction parallel to their axis and between which a variable gap is adjustable in order to match the screening and conveying output to the soil conditions, respectively.

According to DE 299 15 450 U1 (1999) a separating and transfer roller for root crop, in particular potatoes, is proposed wherein the roller has a jacket that is made of resilient material and is designed to yield toward the interior of the roller body. In this way, an elastic system is utilized with which deposition of sticky soil is prevented because the cleaning action is achieved by the roller jacket that carries out a strong kneading action.

In addition to the aforementioned plurality of stripper constructions that require additional components, control-technological solutions in regard to driving the rollers have been proposed also for cleaning the rollers. In particular, after interruption of the mixture feed to the rollers, the rollers can be moved at increased rotary speed so fast that cleaning by centrifugal force of the roller surface is achieved. These cleaning processes require additional protective devices, the productivity of the device is disadvantageously reduced because of the downtimes for cleaning the system, and complete removal from the system of fiber material admixed with sticky soil is not achievable.

The object of the present invention is to provide a method for separating root crop from a mixture as well as a conveying and separating device for carrying out this method, wherein the method and the device should be useable without causing blockage even in connection with admixtures that are comparatively moist and have the tendency to stick to the crop so that downtimes for additional cleaning phases are prevented and an increase of productivity of the agricultural separating process is enabled.

SUMMARY OF THE INVENTION

In accordance with the present invention, this is achieved by means of a conveying and separating device configured such that the separating rollers can be kept free by a direct forced cleaning action at least of parts of the harvested mixture that have a tendency to adhere.

In accordance with the present invention, this is achieved in connection with the method in that the separating rollers are immediately cleaned at least during the separating or screening process performed in that the mixture is placed onto a separating stretch comprised of at least two rotatingly driven separating rollers, the admixed parts are removed in a screening phase by means of a screening gap between the separating rollers, and the root crop is conveyed on the topside of the separating rollers.

According to the invention, for use in agricultural separating devices a method is proposed for a functionally improved assembly whose at least two separating rollers maintain with comparatively minimal technical expenditure their conveying and separating function even for conditions of use in connection with crop mixtures having admixed parts with a high moisture content in the soil. In this connection, soil structures that have a tendency to stick, plant admixtures and similar parts are already subjected to a removal effect leading away from the separating rollers during the feeding phase to the surface of a roller body of the separating roller so that by means of a method control with forced cleaning action, superimposed onto the conveying, separating or screening processes, it is possible to provide permanently dean active surfaces for the conveying and separating work of the device or its roller bodies.

The method according to the invention with forced cleaning action, in view of the analysis of the variety of solutions proposed in the aforementioned prior art, is based on the recognition that in case of sticky soils the problem of adhering soil cannot be eliminated by tumbling disks or similar rotational constructions. Therefore, the innovative concept of the present invention for avoiding the known problem of soil deposits on the roller bodies is based on a combined action mechanism used for the first time in agricultural engineering according to which action mechanism a removal and entraining effect, forcedly acting radially as well as axially in the soil depositing zones, is utilized in a targeted way and the separating rollers with paired interaction are immediately or directly cleaned.

With an advantageous simple embodiment of the roller body arrangement or its drive assembly it has been proven surprisingly that rotational movements introduced into the screening gap between the two roller bodies and additional adjusting or relative movements can be converted into a combined entrainment and shearing action and, in this way, the parts of the crop mixture that have the tendency to stick to the roller bodies can be removed permanently and carried away. In this connection, entrainment profiles of the roller bodies especially with paired interaction are controlled such that in addition to their rotational movement of a relative pivot movement causes a helical "axial displacement". In this connection, axial as well as radial phase-displaced cleaning areas can be predetermined with which the entire circumference of the two roller bodies that "mesh" within a cleaning gap can be subjected to a forced cleaning action by a shearing zone that is of a helical configuration. The roller body are in mutual "cleaning engagement" so that soil, plant fibers and the like mixture components are rubbed off, separated from or peeled off the surfaces.

The concept according to the invention of this forced cleaning method is utilizable for devices where the harvested material is conveyed in the direction of the separating rollers in the form of axial conveying devices as well as in the form of transverse conveying devices where the harvested material is moved transversely to the longitudinal axis of the rotating separating rollers. In the case of interaction of profiled roller bodies with smooth rollers the forced cleaning action is achieved also.

In the axial separating device with, in particular, paired oppositely rotating roller bodies with entrainment profiles, a phase adjuster is active in addition to the rotary drive with which in particular also during the conveying and separating process the relative engagement position of the meshing entrainment profiles can be changed. These circulating entrainment profiles or their profiled sections that are in shearing engagement, respectively, can be permanently reciprocated within the screening gap so that the roller bodies along a cleaning line that is circumferentially extending in a helical shape in accordance with the entrainment profile clean one another mutually and the shearing zone between two axially spaced extreme points that is constantly active in this connection can be moved continuously. For the adjusting movement that is to be superimposed on the rotary movement for generating the moving shearing zone, an additional drive with mechanical gear unit is provided in a simple embodiment, the phase displacement can be introduced by this additional drive by means of a pivot adjustment of the roller bodies.

In an embodiment of the separating roller system in the form of a transverse conveyor, the phase displacement in the area of the roller bodies or their entrainment profile is also generated by an additional drive wherein the radial phase position of the two meshing roller bodies is generated by an adjusting movement on a gear unit with a sliding gear. This sliding gear is imparted with a linear adjusting movement and this movement is translated by means of a gear unit into a radial pivot movement of at least one of the meshing roller bodies; in this way, in the area of the respective entrainment profiles the relative movement of the shearing zone is achieved in axial and radial directions.

In a further advantageous embodiment of the concept according to the invention it is provided that the permanent forced cleaning action is used for a separating device in which a transverse conveyor and a longitudinal conveyor are combined with one another. It is also conceivable that the described concept of the forced cleaning action method is integrated directly into appropriate constructions for mixture transport in harvesting machines, for example, root crop harvesters or potato harvesters, or separate soil-removing or fractioning devices are provided with the components of the inventive forced cleaning action.

DESCRIPTION OF THE PREFERRED EMBODIMENTS

Figure 1:
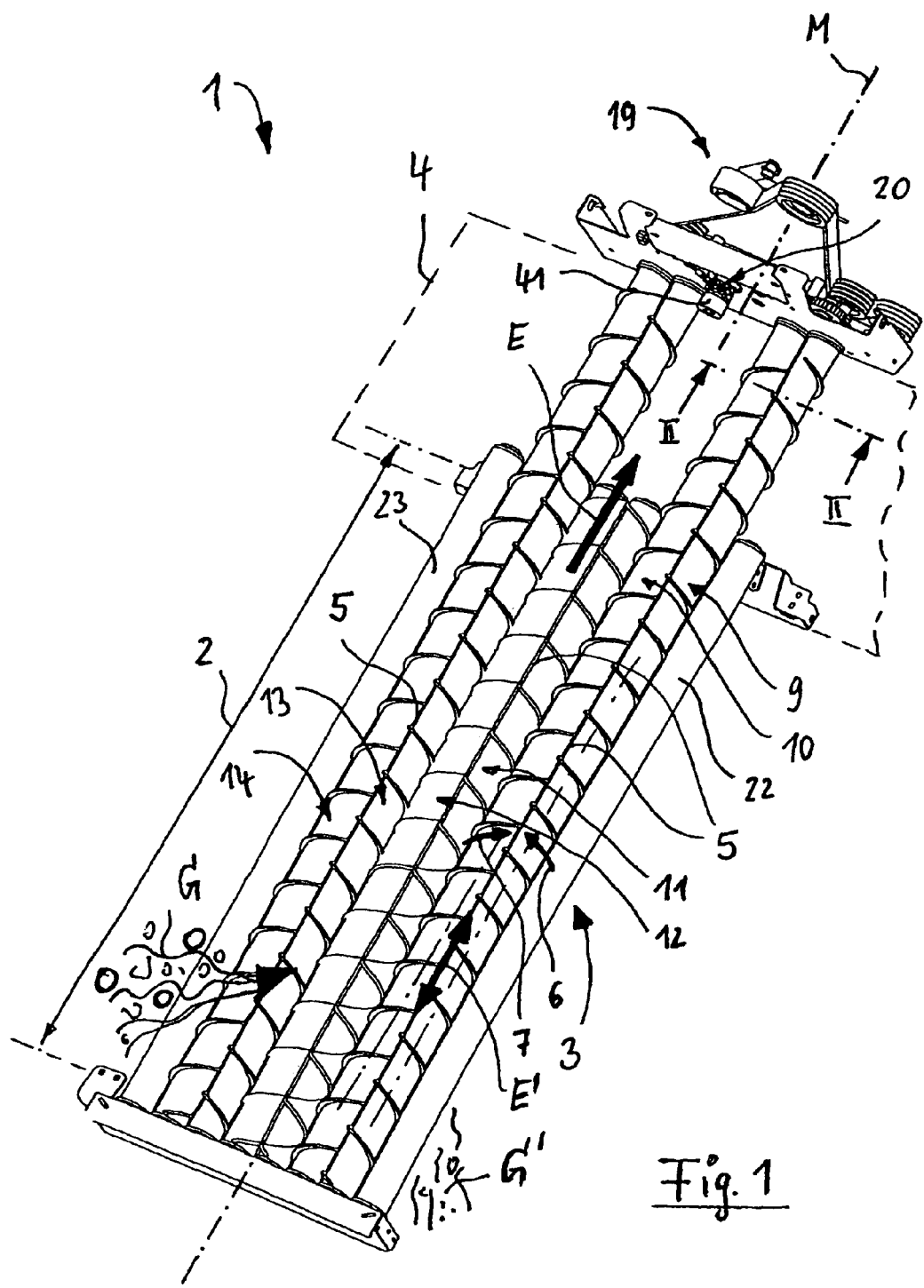
FIG. 1 is a perspective illustration of a conveying and separating device embodied as an axial roller table with a separating roller arrangement provided with a forced cleaning action.

FIG. 1 illustrates a conveying and separating device referenced by numeral 1 for a harvested agricultural crop. Such devices have a separating stretch 2 onto which a mixture G of potatoes, roots or the like crop can be deposited in admixture with stones, clods of soil or the like admixed parts. By means of separating rollers 3 that are driven in rotation it is primarily the crop that is being transported on the topside (arrow E) so that it reaches a removal device 4 or something similar (not illustrated in detail) at the end of the stretch 2. The separating rollers 3 are spaced apart from one another in the area of a screening gap 5 so that when starting a screening phase with rotating separating rollers the admixed parts G' can be removed essentially below the separating stretch 2. In case of a high proportion of admixed parts in the mixture G that have a tendency to adhere to the crop, in the known separating devices 1 there is the danger that the screening gap 5 will be clogged increasingly by deposits so that, in this way, the throughput of the device 1 is reduced or an interruption of the screening process for the purpose of cleaning the separating rollers becomes necessary.

Figure 2:
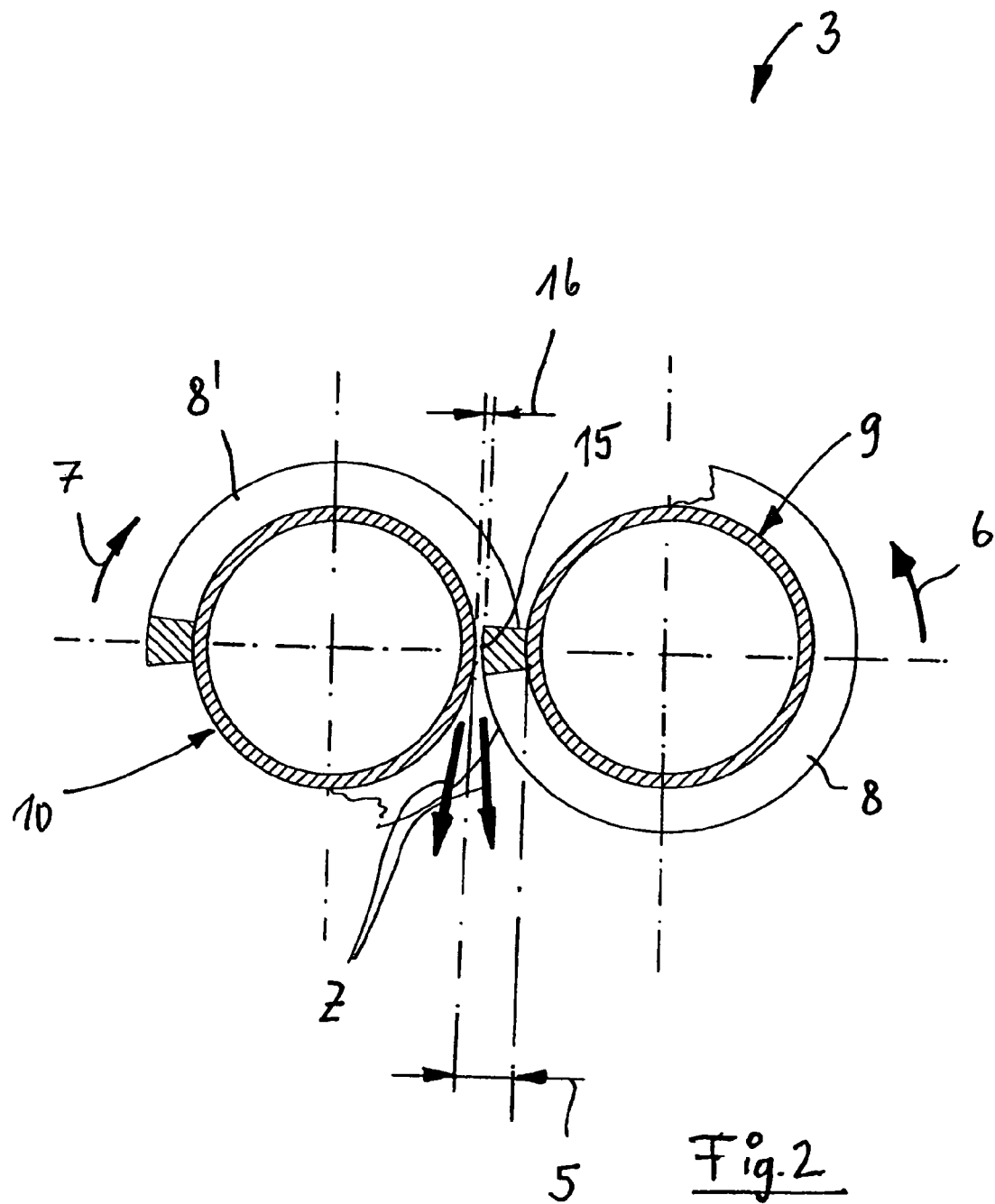
FIG. 2 is a section illustration of the forced cleaning action according to the invention in the area of the meshing entrainment profiles of paired interactive roller bodies according to the line II-II of FIG. 1.

The concept according to the invention proposes separating devices generally referred to by numeral 1 whose separating rollers 3 can be kept free of deposits of adhering or sticky parts of the mixture G by means of an immediate forced cleaning action (arrow Z in FIG. 2). This forced cleaning action Z can be utilized for screening and separating processes in agricultural engineering in principle for any type of roller separating units wherein the forced cleaning action integrated into the construction makes it possible to eliminate additional cleaning elements and/or cleaning interruptions that have been required in the past.

Figure 3:
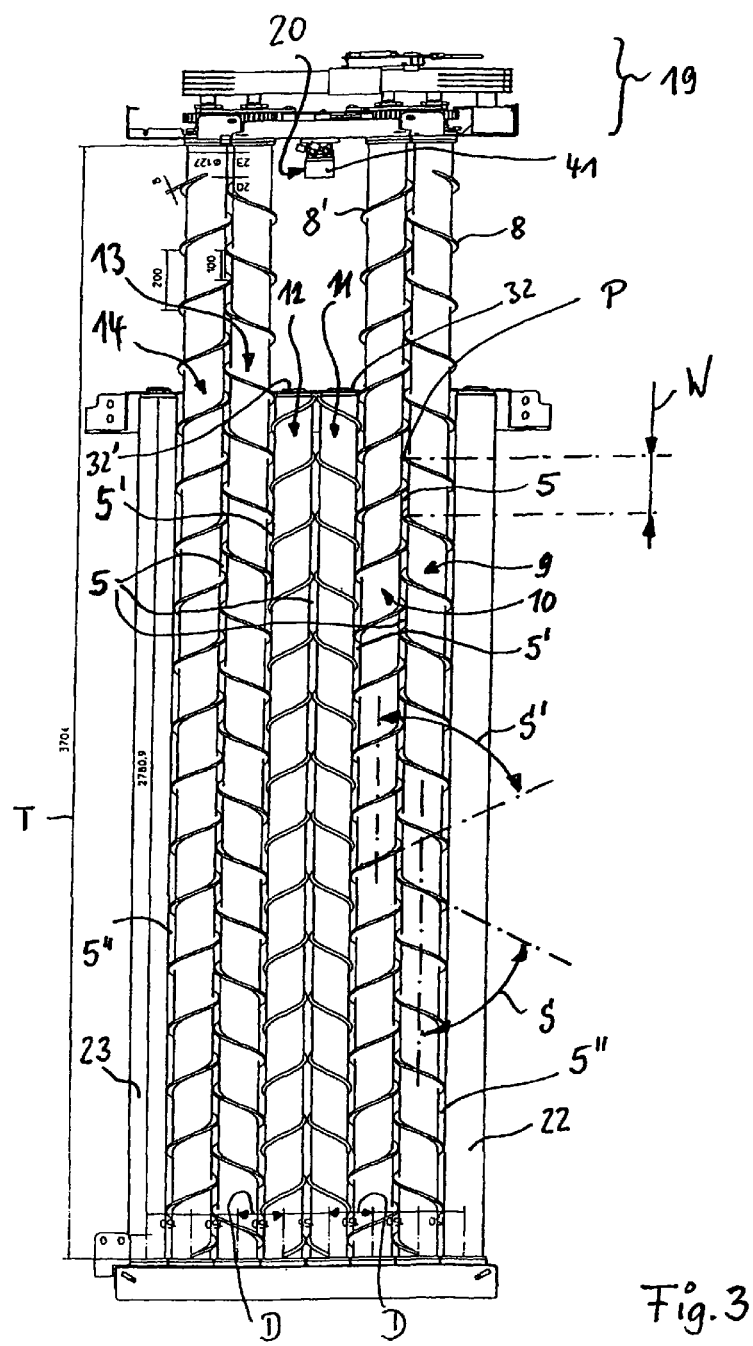
FIG. 3 is a plan view onto the axial roller table according to FIG. 1.

When looking at FIG. 2 in combination with FIG. 3, it is apparent that this forced cleaning action Z is made possible without any additional auxiliary tools or the like immediately in the area of the screening gap 5. In this connection, an optimal cleaning effect is achieved in that the forced cleaning action Z can be performed permanently in the screening phase of the device 1 or of the oppositely rotating separating rollers 3 (arrows 6 and 7 indicate rotation in FIG. 2). In the simplest embodiment it is provided that adhering or sticky parts of the supplied mixture G between paired separating rollers 3 interacting with one another are engaged by the forced cleaning action Z (principal illustration according to FIG. 2).

Figure 7:
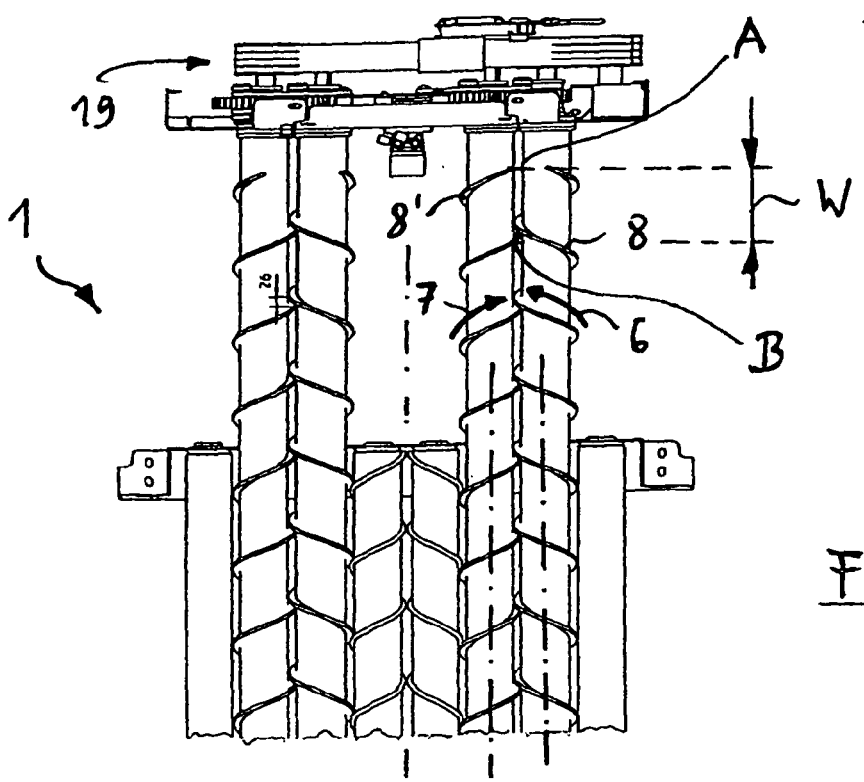
FIG. 7 is a plan view, partially in section, of the axial roller table with roller bodies and their entrainment profiles in the end position according to FIG. 6.
Figure 9:
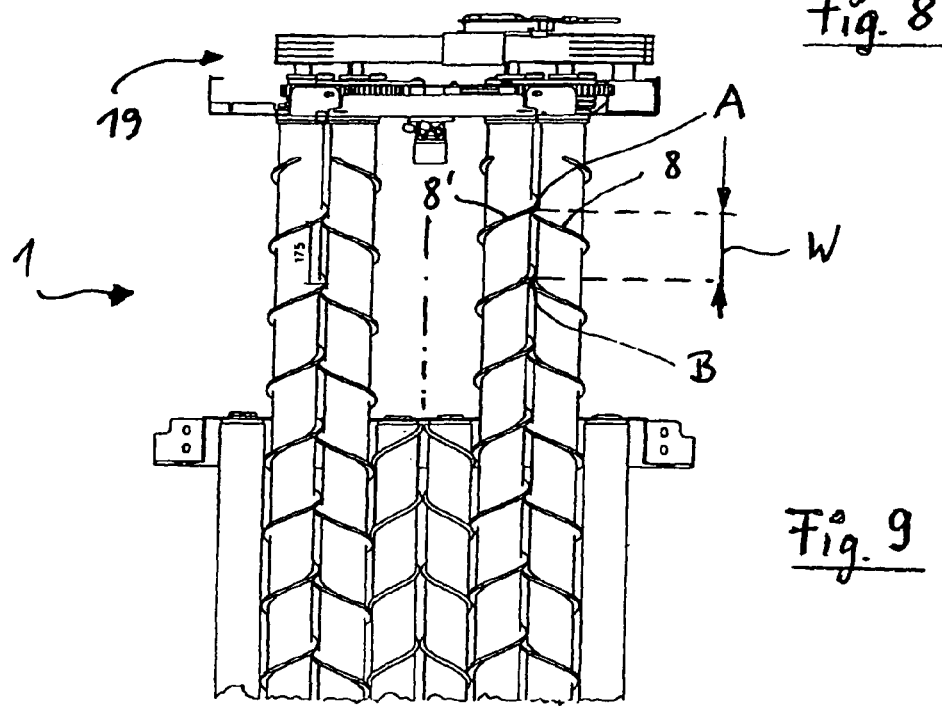
FIG. 9 is a plan view, partially in section, onto the axial roller table showing the second end position according to FIG. 6.

By superimposed movement components, i.e., rotational movements 6 and 7 as well as an axial displacement E' that is oriented in the same or opposite direction relative to the conveying movement E in the screening gap 5 lead to a concept of forced cleaning action Z that is effective at the same time as a screening phase (removal G') and, in this connection, is defined in the axial direction of the separating rollers 3 by displaced zones of action W (FIG. 3, FIG. 7, FIG. 9). For this general complex of action of a forced cleaning action Z the separating rollers 3 can be provided with generally known roller bodies 9 that have a peripheral entrainment profile 8, 8' as a cleaning member. The roller arrangement is optimized in this connection such that paired roller bodies 9, 10; 11, 12; 13, 14 that interact with one another in pairs are used for advancing in the direction E as well as separation G' of the mixture parts as well as for the immediate permanent forced cleaning action Z of the respective screening gap 5.

The plan view according to FIG. 3 illustrates that the paired driven roller bodies 9, 10 each have the radially and/or axially combinable entrainment profiles 8, 8' that cooperate in the screening gap 5 that is defined by the distance between the roller bodies 9, 10 in such a way that a cleaning gap 16 (FIG. 2) that defines a shearing zone 15 with forced cleaning action Z can be predetermined or adjusted by means of appropriate roller dimensions or can be adjusted to the constructive and/or harvesting conditions.

The detail illustration according to FIG. 2 shows that the entrainment profiles 8, 8' of the paired oppositely rotating roller bodies 9, 10 (likewise: 11, 12; 13, 14) that mesh with one another form by means of their respective shearing zones 15 (or the zones of action W that exist across the length of the separating stretch 2; FIG. 3) a forced cleaning action Z that acts like a mechanical abrasive system for the entire circumferential contour of the roller bodies.

With the concept of a forced cleaning action Z in accordance with the present invention the parts of the mixture G that have a tendency to stick and that reach the area of the cleaning gap 16 or the screening gap 5 of the entrainment profiles 8, 8' acting as continuously operating cleaning members are stripped off the contour and the periphery of the paired roller bodies 9, 10; 11, 12; 13, 14. For this cleaning process that requires a complex control of the respective separating system an axial displacement and/or radial pivot adjustment of the at least two roller bodies 9, 10 is introduced as additional adjustment and action components into the system of the rotatingly driven separating rollers 3. In this way, in contrast to known technical solutions, for the first time a cleaning gap 16 is defined in the shearing zones 15 that by means of the drive rotation is acting in a radially circulating way and that by means of the relative displacement E' is axially moving; in these shearing zones the surprising effect of a permanent forced cleaning action Z is ensured.

As a technical realization of this basic concept, the entrainment profiles 8, 8' in accordance with their respective size configuration, their arrangement on the roller bodies 9, 10, and/or their cross-sectional shaping can be designed such that in accordance with specific separating and conveying conditions for root crop or like products a process optimization can be enabled with substantially variable cleaning gaps 16.

In the first embodiment of the device 1 according to FIGS. 1 to 10 the roller bodies 9, 10; 11, 12; 13, 14 are provided whose respective entrainment profiles 8, 8' extend coil-shaped or helically-shaped about the circumference. For the purpose of a simplified illustration the repeating entrainment profiles 8, 8' are not shown on each one of the roller body.

From the plan view of the system according to FIG. 3 it becomes apparent that the roller body pairs 9, 10 shown as an example are provided in the area of the coil-shaped profile entrainment profiles 8, 8' with oppositely pitched helical lines relative to the screening gap 5 (pitch S, S'). This also illustrates that the roller bodies 9, 10 with the entrainment profiles 8, 8' forming the cleaning gap 16 are formed as a monolithic part in a preferred embodiment.

Figure 11:
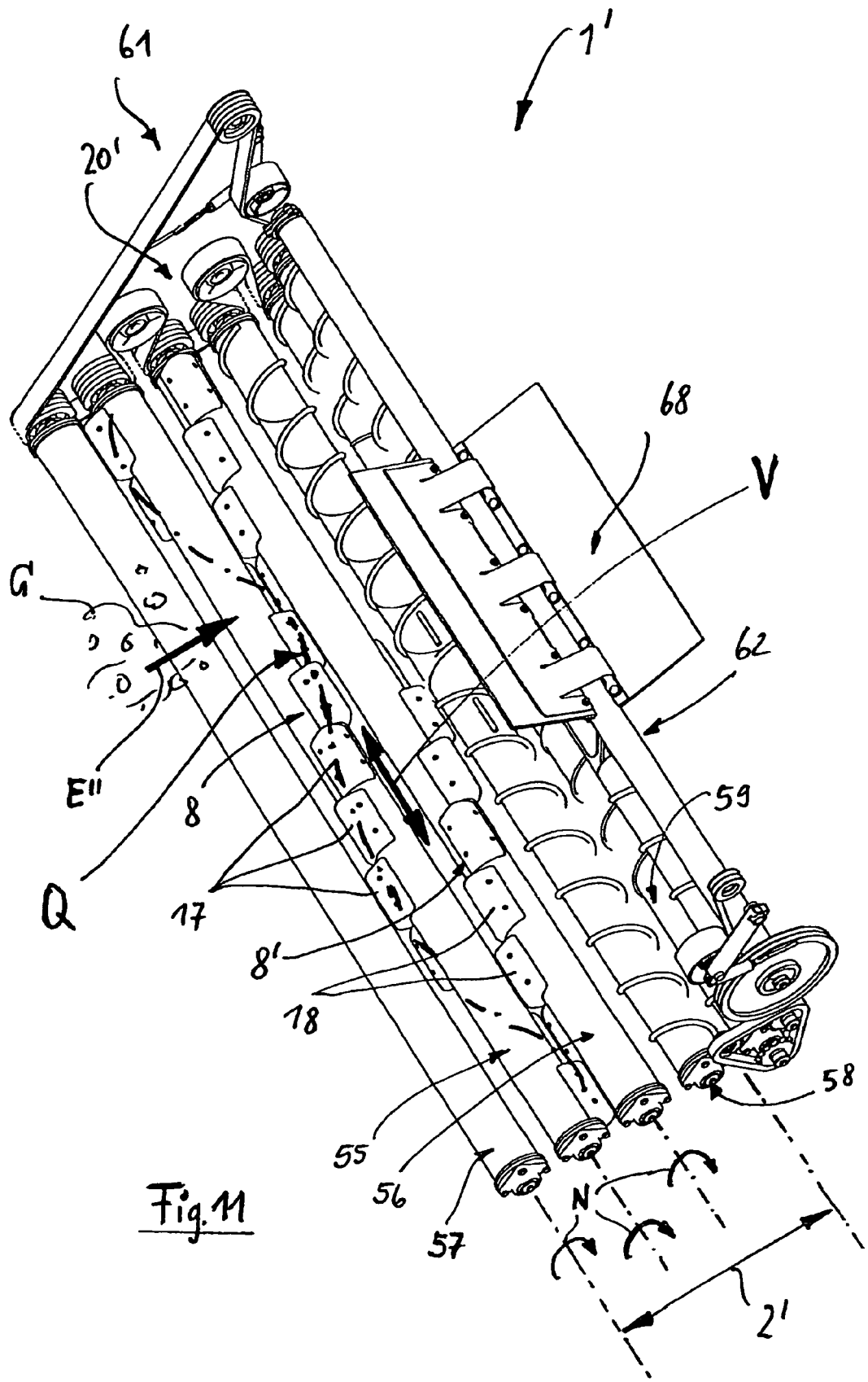
FIG. 11 is a perspective illustration of a second embodiment of the conveying and separating device embodied in the form of a transverse roller table.

In a further embodiment of the roller body (similar: FIG. 11) it is provided that its helically extending entrainment profiles are in the form of segments 17, 18 or similar parts. In this connection, it is also possible that the entrainment profiles are embodied as finger profiles provided with an axial spacing on the respective roller body. In accordance with the essentially known roller designs in principal also single or two finger variants are conceivable (not illustrated) and the forced guiding action Z can be performed with them.

The first embodiment of the device 1 illustrated in FIGS. 1 to 10 has at least one additional adjusting drive or actuator 20 in the area of the respective interacting pairs of roller bodies 9 to 14 that are driven by means of a conveying drive 19. By means of the actuator 20 at least one of the roller bodies of each pair is movable radially and/or axially in addition to the rotary driving action (arrow 6, 7) in such a way that afore described forced cleaning action Z is effected.

This embodiment of the drive concept is designed such that upon operation of the device 1 the conveying drive 19 and the at least one actuator 20 (FIG. 4) can be simultaneously operated. In this way, the forced cleaning action Z acting on the respective roller body pairs in the area of the entrainment profiles 8, 8' is activated and a complex sorting and self-cleaning process with forced cleaning action is effected such that complete separation of the mixture is possible over an extended operating time of the device 1. In a further embodiment it is conceivable that, in addition to the conveying drive 19, several actuators 20 are integrated into the system (not illustrated).

Figure 4:
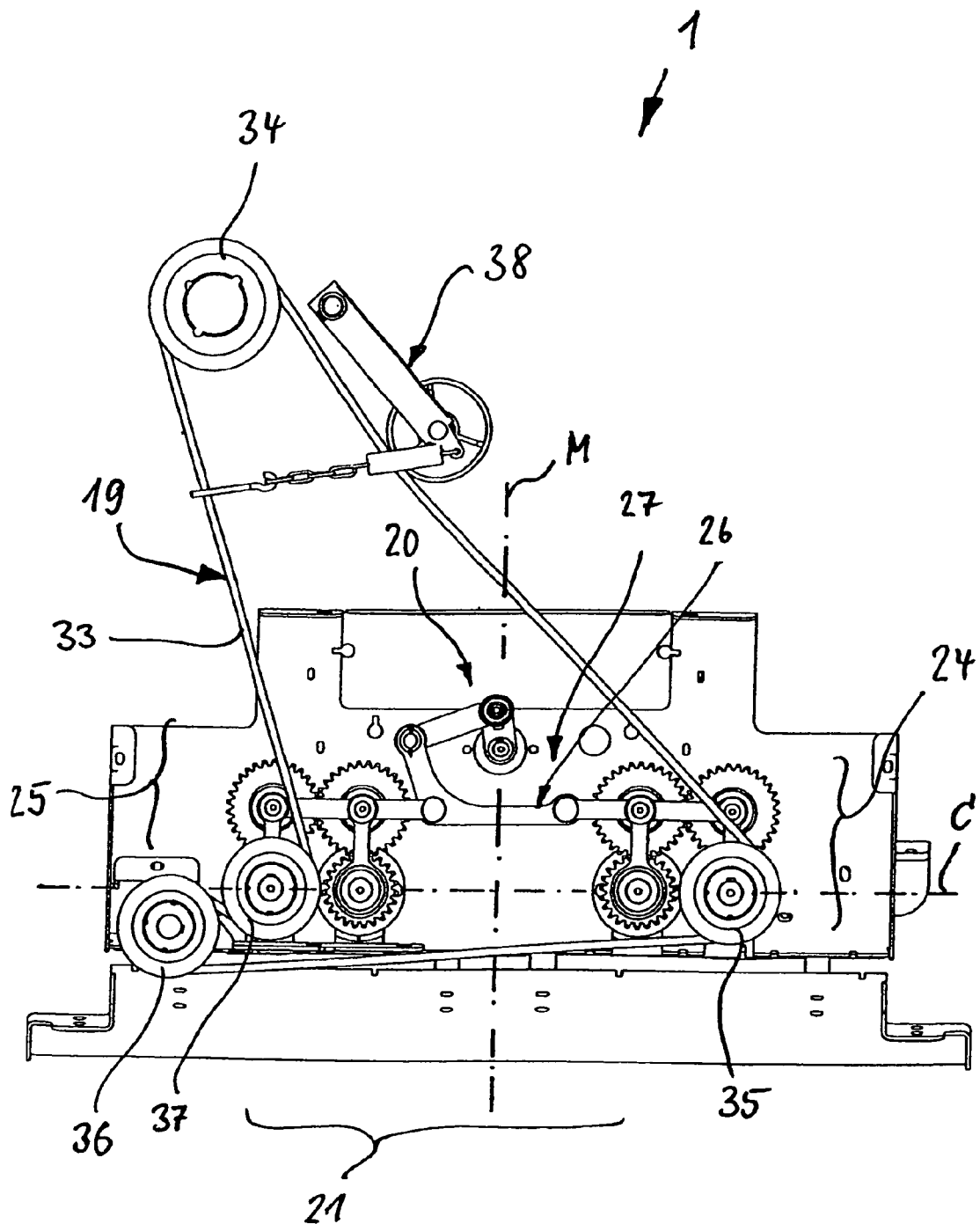
FIG. 4 is an end view of the drive side of the axial roller table according to FIG. 3 with an adjusting mechanism that effects a radial phase adjustment of the roller bodies.
Figure 10:
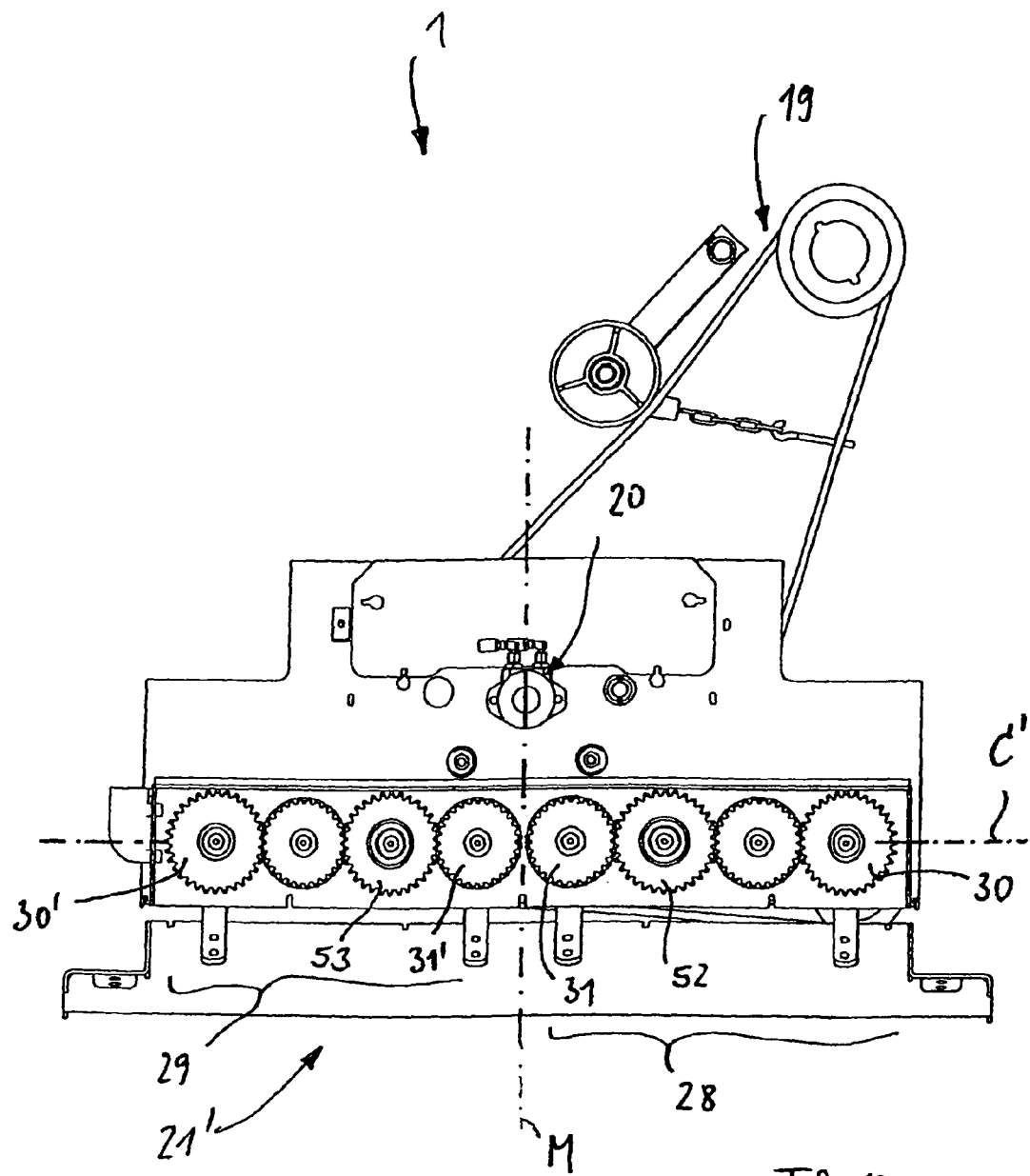
FIG. 10 is an end view of the axial roller table according to FIG. 3 showing the end of the roller bodies with gear parts positioned opposite the adjusting mechanism (FIG. 4).

The detail illustrations according to FIGS. 4 and 10 show in respective end views the pairs of roller bodies that interact in horizontal engagement planes C and C' wherein gear connections (referenced generally by numerals 21, 21') have integrated therein the conveying drive 19 and the common actuator 20 so that the entrainment profiles 8, 8' effect with an additional pivot adjustment or actuation (to be described in the following in more detail) the radial and axial forced cleaning action Z (by changing the relative position of entrainment profiles 8, 8' in the zone of action W according to FIG. 3, FIG. 7, and FIG. 9).

In the illustrated drive concept, the conveying drive 19 is active simultaneously with the actuator 20 wherein by means of appropriate constructive modifications also respective individual drives or additional axial (linear) pushing drives for the roller bodies are conceivable (not illustrated). For an optimal configuration of the respective length of the separating stretches 2 (FIG. 1) or 2' (FIG. 11) the respective actuator 20 and the gear connections 21, 21' are provided at the ends of the roller bodies. Conceivable is also that a central drive for the conveying movement E is installed (device modification not illustrated).

By means of the device 1 according to FIGS. 1 to 10, a separating stretch 2 in the form of an axial roller table is shown in which roller bodies are provided that are axially oriented parallel to the conveying direction E of the mixture G. This axial roller table has more than the two paired roller bodies 9 and 10 that have been used above as a reference point for the forced cleaning action Z. In an expedient embodiment, the axial roller table, beginning at a central longitudinal plane M extending between the rollers of the first roller pair 11, 12, is provided adjacent thereto with a second roller body pair 9, 10 as well as a third roller body pair 13, 14 wherein all of these pairs have roller bodies rotating in opposite directions.

The plan view according to FIG. 3 illustrates also that the roller bodies provided with entrainment profiles 8, 8' that rotate oppositely relative to the screening gap 5 are also provided with a spacing D relative to the adjacently positioned pair and the spacing D defines a screening gap 5'. In this connection, it is also apparent that the second and third roller body pairs 9, 10 or 13, 14 each have correlated therewith at the exterior side, as an additional separating element, a smooth roller 22, 23; the smooth roller 22, 23 circulates relative to a screening gap 5" also provided with a forced cleaning action in such a way that lateral escape of harvested crop is prevented and the harvested crop is permanently conveyed in the conveying direction E.

The constructive configuration of the gear unit 21 (drive side) or 21' (opposite side) can be taken from FIG. 4 in combination with FIG. 10 wherein it is apparent that the three roller body pairs have at one end in the area of the actuator 20 gear drives 24, 25 that directly engage the second (9, 10) and the third pair (13, 14). These two gear drives 24 and 25 can be actuated together by means of an auxiliary drive 27 provided with a linkage assembly 26 and engaging the actuator 20. The other connecting parts of the three roller body pairs arranged in the area of the horizontal plane C' (FIG. 10) are designed such that immediately opposite the actuator 20 two gear sets 28 and 29 that are divided in the area of longitudinal center plane M are provided. In an expedient embodiment, by a means of an outer gearwheel 30, 30' the smooth rollers 22, 23 are indirectly driven. Also, when looking at FIG. 3 and FIG. 10, it can be seen that the central first roller body pair 11, 12 is also driven indirectly by means of the gearwheels 31, 31' and that the roller body pair 11, 12 is rotatably supported at the other end (at 32, 32').

The configuration at the drive side (FIG. 4 to FIG. 6) is designed such that the gear drive 24, 25 is connected by means of a belt drive 33 with pulleys 34 to 37 provided as a conveying drive 19 and a tensioning device 38 so that in this way a synchronous rotation of the assemblies of the system is ensured.

Figure 5:
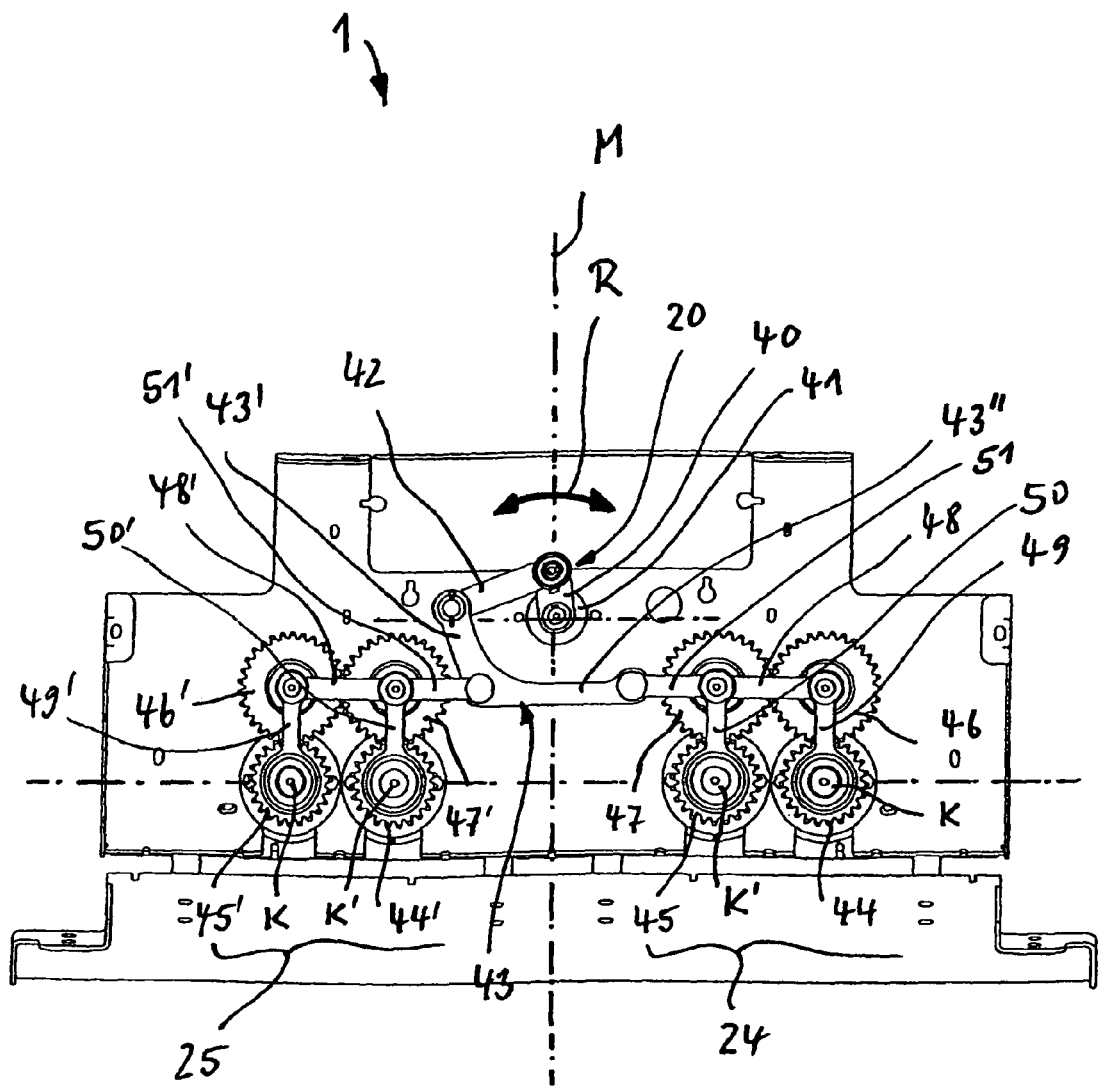
FIG. 5 is a plan view of the adjusting mechanism similar to FIG. 4 wherein only its drive member with its intermediate gearbox is illustrated.

For improved illustration of the phase adjustment enabling the forced cleaning action Z in the area of the three roller body pairs 9 to 14 in FIG. 5 components of the conveying drive 19 are not illustrated so that the details in the area of the two gear drives 24 and 25 are visible. The auxiliary drive 27 interacting with the actuator 20 has in this connection a motor 41 (e.g. y hydraulic motor) that engages by means of crank 40 the linkage assembly 26, wherein the motor 41 is supported centrally in the area of the longitudinal center plane M. At the end of the crank 40 a deflection lever 42 is pivotably attached and it cooperates with a pushrod 43 that has legs 43' and 43" and is oriented toward the gear drives 24, 25.

The gear drives 24 and 25 provided for pivot adjustment of the roller bodies 9 to 14 have in turn adjusting gears 46 and 47 or 46' and 47' that engage the drive gears 44 and 45 or 44' and 45' of the two directly driven roller body pairs 9, 10 and 13, 14. These adjusting gears 46, 47 are connected by means of a transverse rod 48, 48', respectively, and are pivotably correlated by a vertical lever 49, 50 or 49' 50', respectively, to the respective axes K, K' of the roller body pairs.

The afore described gearwheel systems 24, 25 are affected in that the two adjusting gears 46, 47; 46', 47' are pivotably connected by the connectors 51, 51' with the pushrod 43. By means of the motor 41 a rotational movement (FIG. 5) generally identified by R can be introduced. This additional rotational movement can be transmitted by means of the deflecting lever 42 onto the pushrod 43 so that by a pivot and push movement this central auxiliary drive 27 effects a pivot action in the same direction of the roller body pairs that in particular rotate in the same direction as the conveying drive 19; in this way the entrainment profiles 8, 8' enable the relative movement like an axial displacement E'.

When looking at FIG. 3, FIG. 7, and FIG. 9, the decisive movement component for the innovative forced cleaning action Z becomes apparent. Relative to the profile 8 considered isolated (FIG. 3), the profile 8 is axially displaced, starting from a central position P relative to the profile 8' between the two extremes B (FIG. 7) and A (FIG. 9) in the zone of action W, so that in this way the additional axial component required in addition to the radial component (rotation 6, 7) is introduced into the system for achieving the forced cleaning action.

Figure 6:
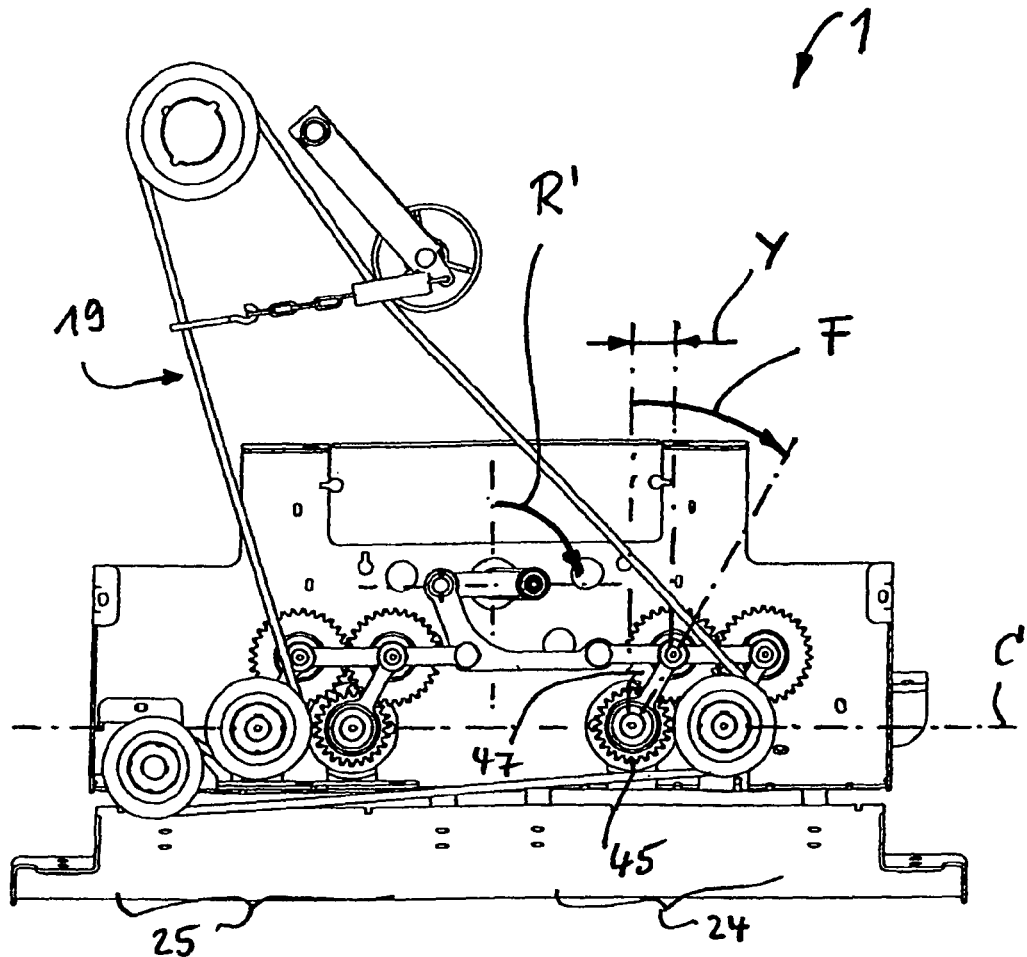
FIG. 6 is a side view similar to FIG. 4 with the adjusting mechanism in a first end position during phase adjustment of the roller bodies.
Figure 8:
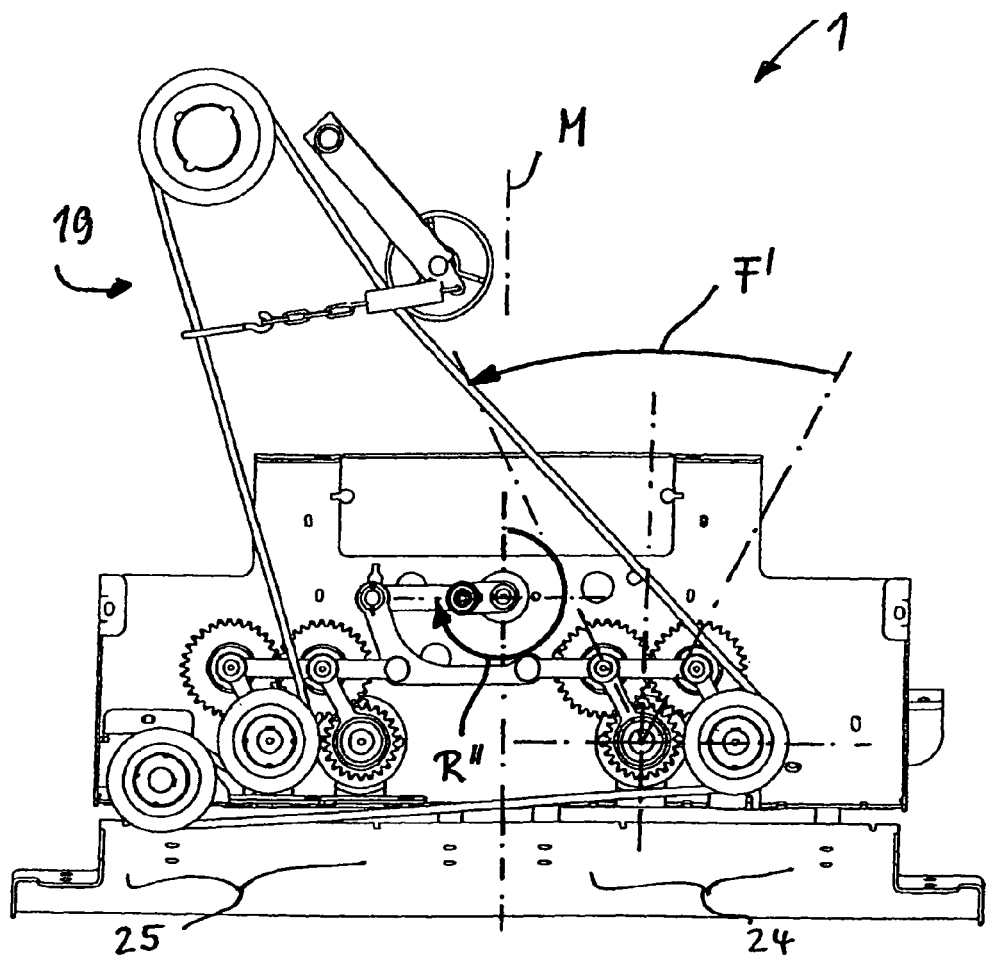
FIG. 8 is a side view similar to FIG. 4 showing a second end position during phase adjustment of the roller bodies.

Based on a central position of the auxiliary drive 27 or of the actuator 20 according to FIG. 5 the control action of the system is illustrated by the movement phases shown in FIG. 6 and FIG. 8. By means of a pivot adjustment R' of the crank 41, the two gear drives 24 and 25 are moved into a first end position A. Based on the gear drive 24 that is shown as an example in FIG. 6, an arc-shaped displacement F of the actuating gear 47 caused by the pushrod 43 (push travel Y, FIG. 6) is apparent. The actuating gear 47 effects upon this displacement F the drive gear 45 of the correlated roller body in such a way that its entrainment profile 8' relative to the profile 8 of the adjacently positioned roller body is phase-displaced into the first of the end positions (point A). A continuation of the rotational movement of the system according to arrow R" (FIG. 8) has the effect that the afore described relative movement between two profiles 8 and 8' with opposite direction is continued in the zone of action W to the second end position (position B, FIG. 7) and this movement course is imparted to the forced cleaning action Z with continuous repetition.

For completion of the afore described drive concept of this axial roller table 1 provided with this forced cleaning action Z reference is being had to the gear connection 21' on the oppositely positioned support zone that is opposite the drive side. In FIG. 10 it is shown that the two central roller bodies 11 and 12 of the first roller body pair are connected indirectly by drive gears 52 and 53 acting on gearwheels 31 and 31' of the roller bodies.

In FIG. 11, a second embodiment of the device according to the invention is illustrated that is provided with roller bodies 55, 56 with forced cleaning action Z (FIG. 12) that extend in the axial orientation transverse to the conveying direction E" of the mixture G; these roller bodies create a separating stretch 2' in the form of a transverse roller table 1'. This embodiment of the transverse roller table 1' has in principle the already disclosed action components for generating the forced cleaning action Z wherein in particular the constructive configuration of the roller bodies or its profiles 8, 8' is similar to the embodiment of FIG. 1.

Figure 12:
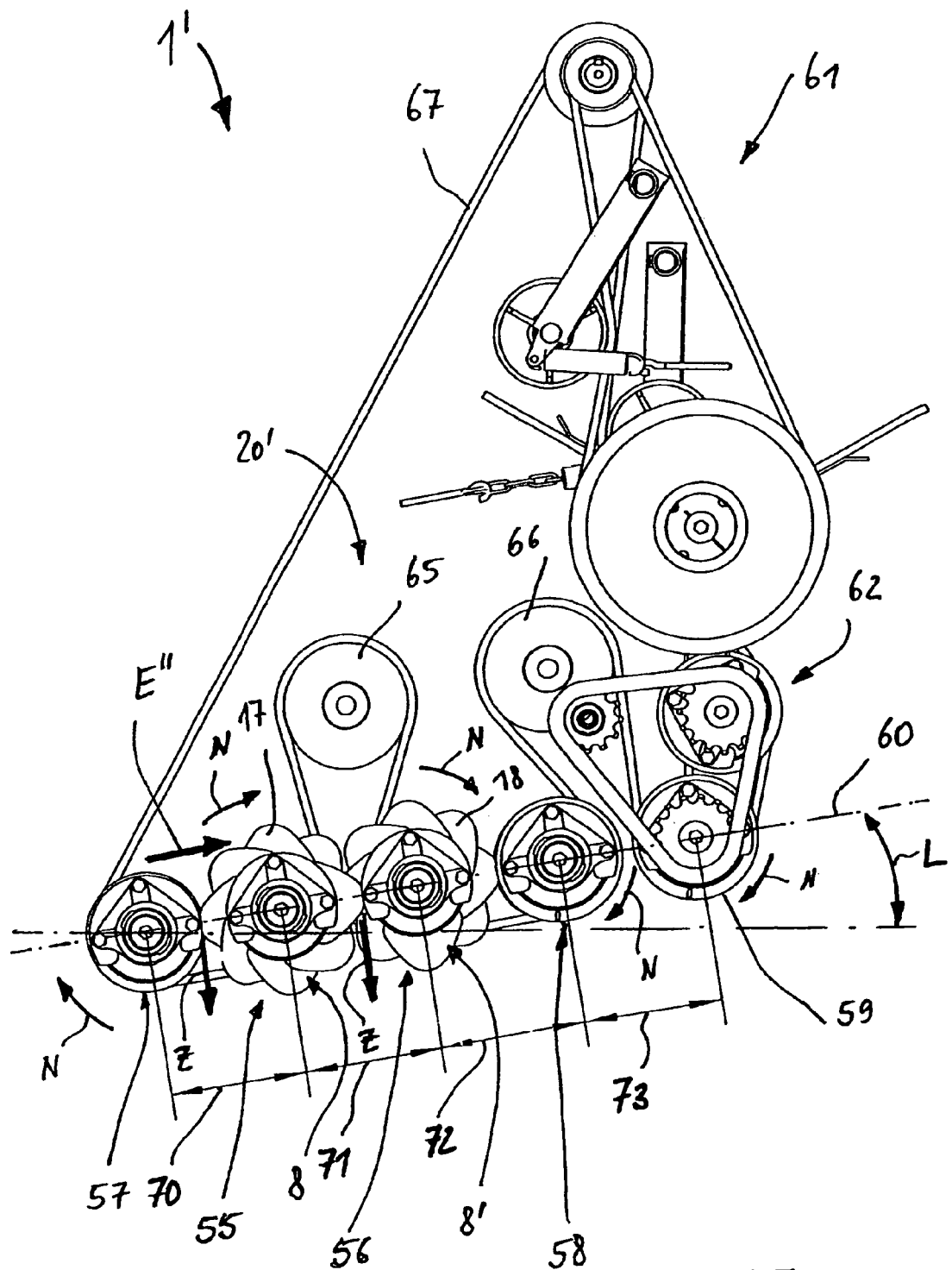
FIG. 12 is a side view of the transverse roller table according to FIG. 11 onto the assembly engaging one end of the roller bodies including the drive and an additional adjusting mechanism.
Figure 20:
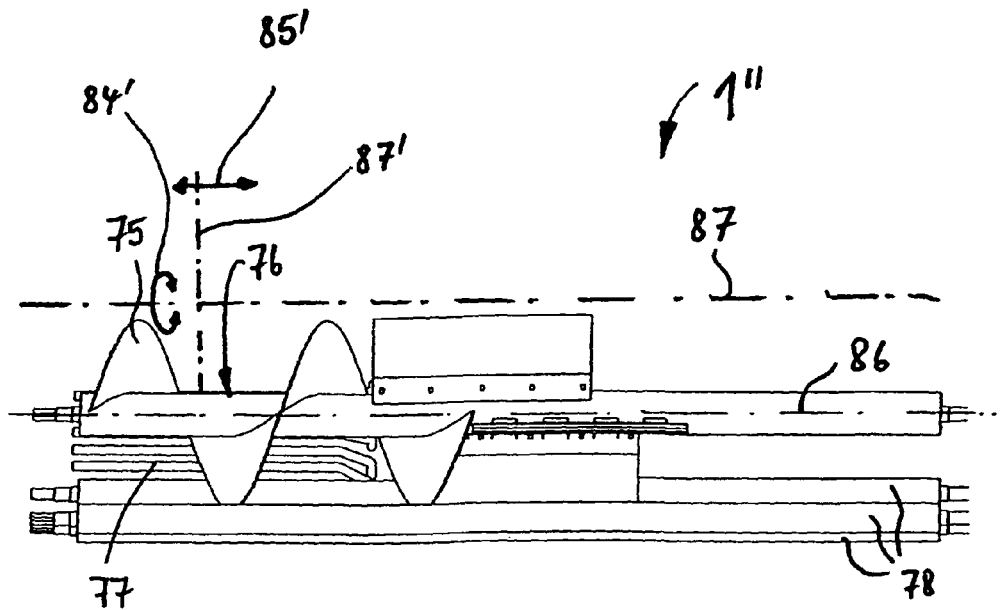
FIG. 20 is a detail front view of a separating device that is incorporated in the assembly according to FIG. 18 in the area between the transverse roller table and the axial roller table.
Figure 21:
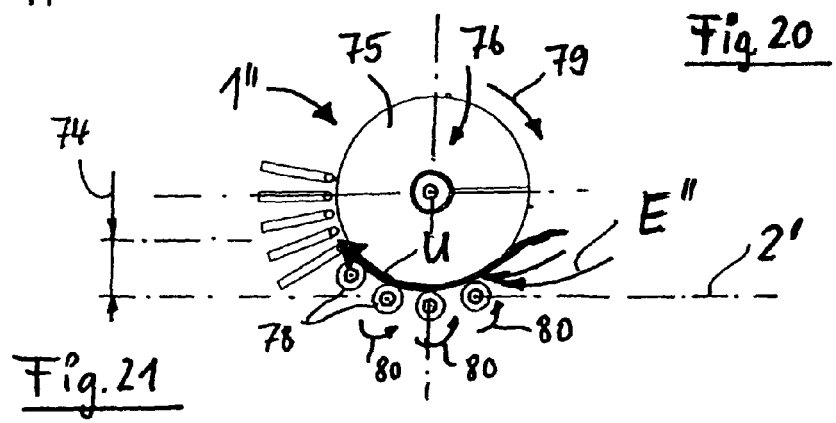
FIG. 21 is a side view of the separating device according to FIG. 20.
Figure 22:
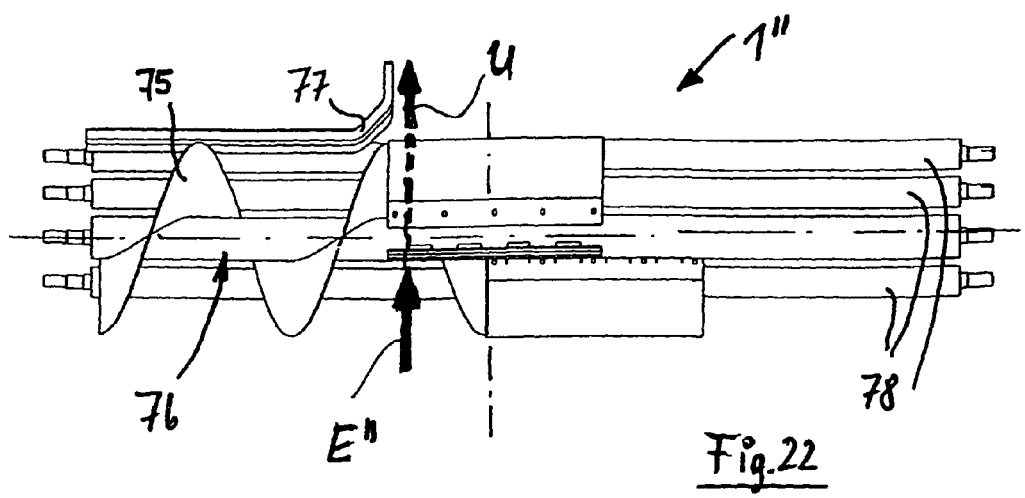
FIG. 22 is a plan view onto the separating device according to FIG. 20.

For the displacement of the transported goods in the conveying direction E", this separating stretch 2' has a conveying drive 61 by means of which all of the roller bodies 55, 56 and the auxiliary rollers 57 to 59 in the area of the separating stretch 2' can be driven with the same rotational direction according to arrow N (FIG. 12). The side view of the transverse roller table 1' according to FIG. 12 shows also that all of the roller bodies 55 to 59 are arranged in a slanted conveying plane 60 (angle L). In adaptation to the provided forced cleaning action Z and the configuration of the entrainment profiles 8, 8", the axial spacings 70, 72 and 73 can be also predetermined based on the axial spacing 71 or can be individually or commonly adjusted in accordance with product specifications or the soil conditions. In an advantageous embodiment of this transverse roller table 1', the table 1' has at the end of the separating stretch 2' a special removal conveyer 62 (FIG. 13; FIGS. 20-22).

Figure 13:
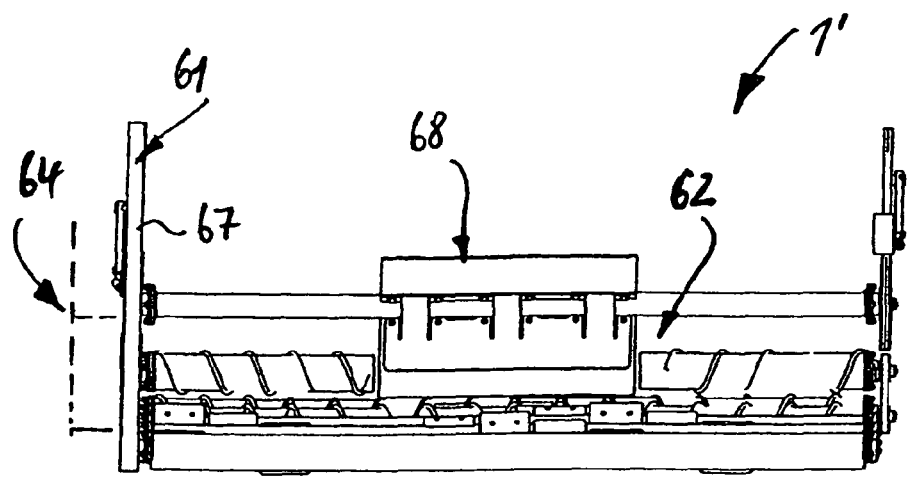
FIG. 13 is a front view of the transverse roller table according to FIG. 11.
Figure 13A:
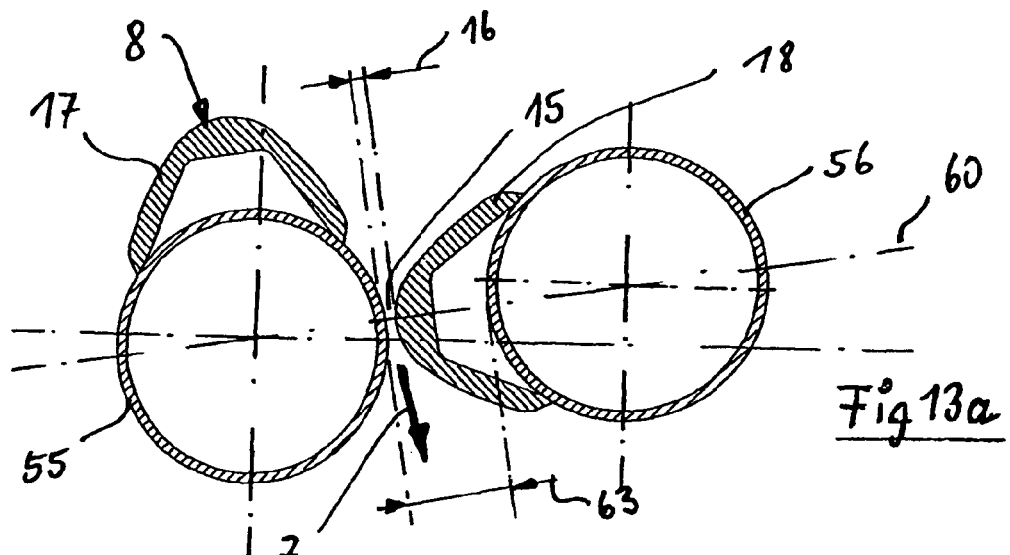
FIG. 13a is a section illustration of the two roller bodies with forced cleaning action in accordance with line IV-IV of FIG. 17.
Figure 13B:
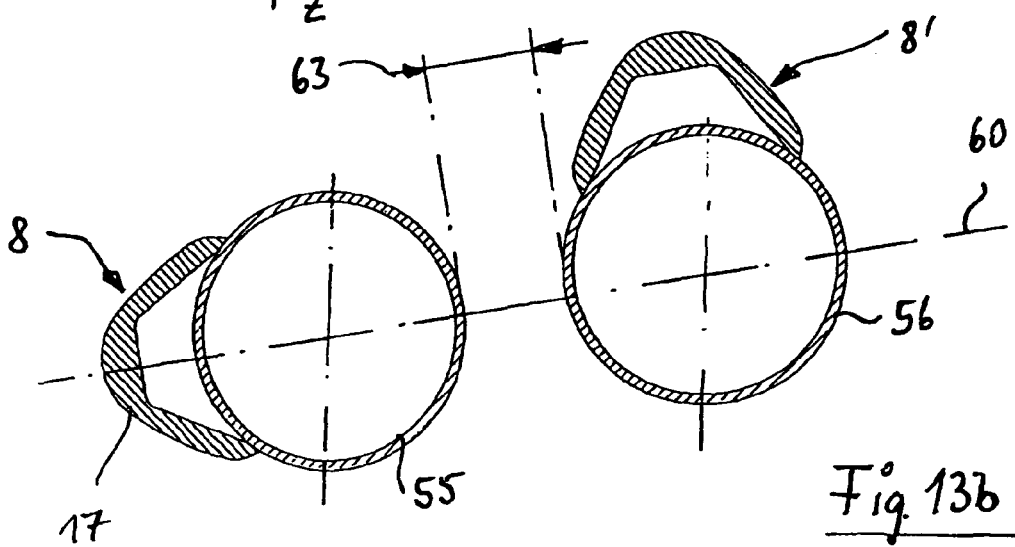
FIG. 13b is a section illustration of the two roller bodies with forced cleaning action in accordance with line III-III of FIG. 15.

In the enlarged detail views according to FIGS. 13a and 13b it becomes apparent that the segments 17, 18 are arranged as entrainment profiles 8, 8' on the roller bodies 55, 56 so that a common screening gap 63 is formed (substantially identical to the screening gap 5 in FIG. 2). For the forced cleaning action Z (FIG. 2) carried out in analogy to the embodiment of FIG. 1 in the area of the segments 17, 18 or the two roller bodies 55, 56, the shearing zones 15 are formed in the cleaning gap 16 (FIG. 13a) so that, when looking at FIG. 13a and FIG. 13b, the phase-wise or section-wise forced cleaning action performed on the circumference of the segment rollers becomes apparent.

Figure 15:
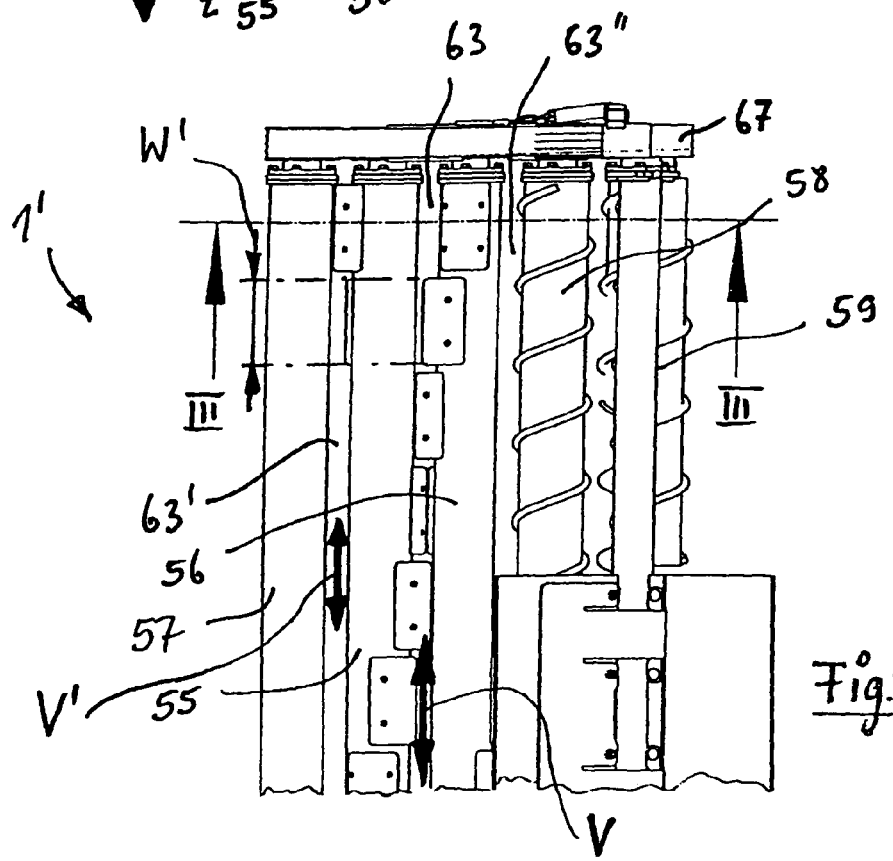
FIG. 15 is a plan view, partially in section, of the transverse roller table according to FIG. 14.

The plan view according to FIG. 15 shows in connection with FIG. 12 that the segments 17, 18 acting as entrainment profiles 8, 8' can also create screening gaps 63', 63" relative to the adjacently positioned roller bodies 55 to 58; the illustration according to FIG. 11 shows that the segments 17, 18 extend for the provided phases of the forced cleaning action in a helical shape with corresponding variable pitch on the roller bodies 55, 56 (line Q, FIG. 11).

Figure 16:
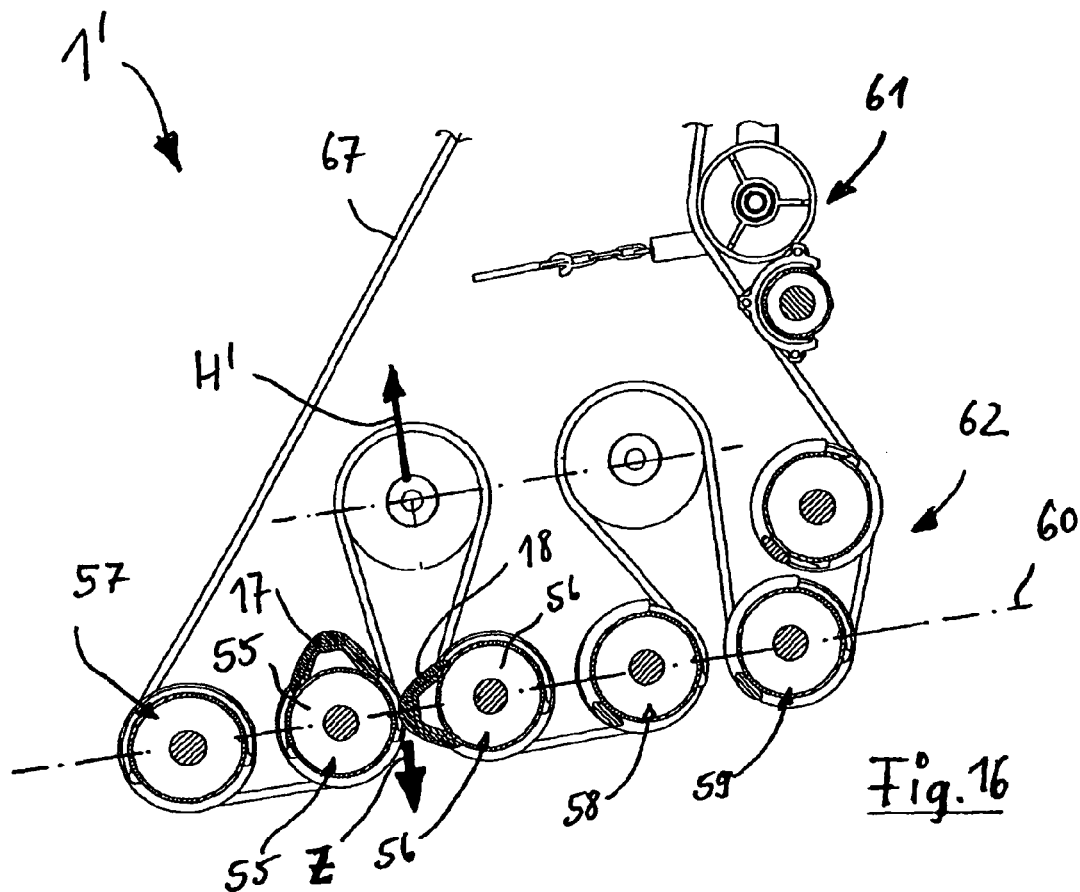
FIG. 16 is a principal illustration of the second adjusting phase upon forced cleaning action of the roller bodies according to section line IV-IV in FIG. 17.

For the phase adjustment of the rows of segments 17, 18 of neighboring roller bodies in the area of the transverse roller table 1' as an additional actuator a lifting member is integrated into the conveying drive 61. In the simplest embodiment, this lifting member is provided in the form of at least one deflecting roller 65, 66 that is supported so as to be substantially linearly height-adjustable (lifting movement H, H', FIG. 14 and FIG. 16) on the machine frame 64 (FIG. 13). In the illustrated embodiment, all rotating parts are driven by a circulating V-belt 67.

Figure 14:
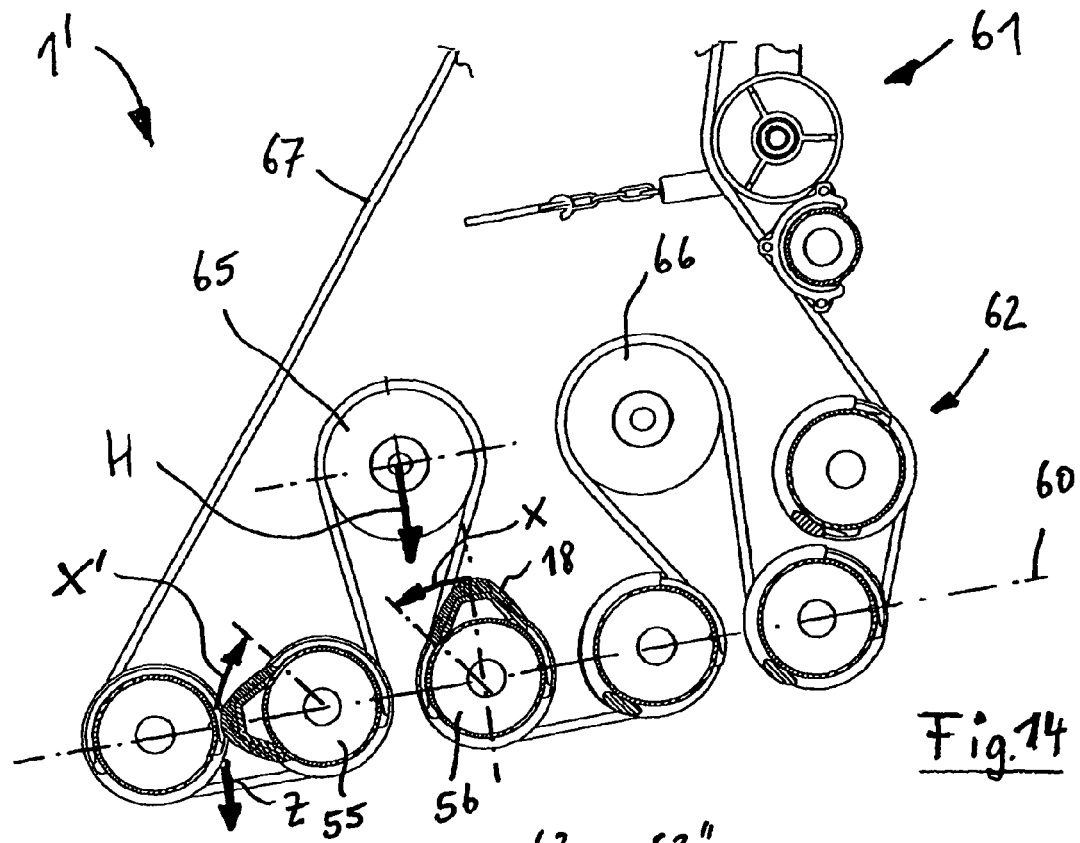
FIG. 14 is a detail illustration of the phase adjustment at the drive side of the roller bodies with entrainment profile according to III-III in FIG. 15.
Figure 17:
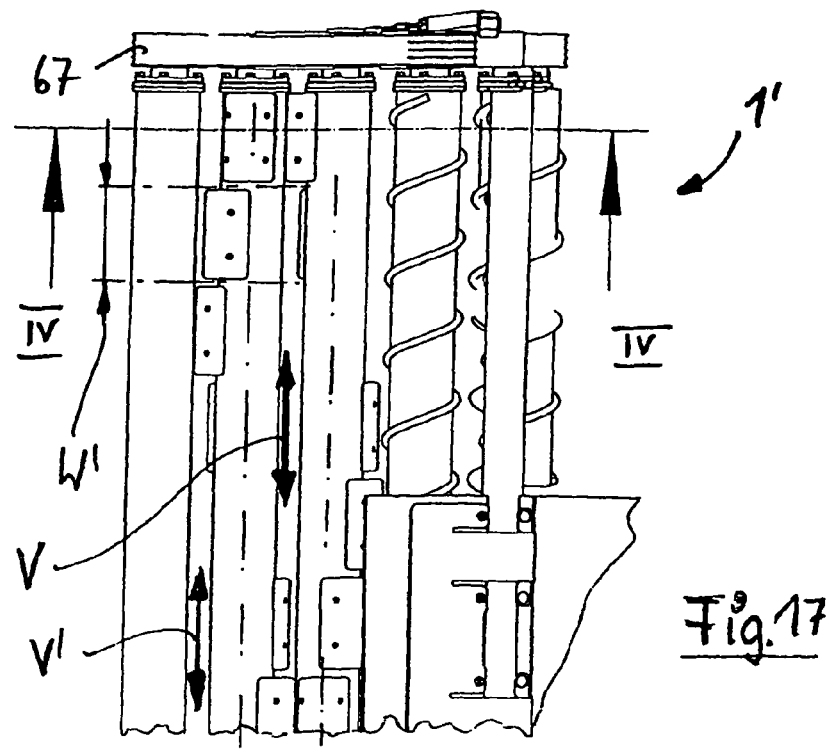
FIG. 17 is a plan view onto the transverse roller table according to FIG. 16.

Starting from the upper end position illustrated in FIG. 14 (FIG. 15, zone of action zone W': open) the roller 65 can be moved downwardly in the lifting direction H such that (simultaneous to the rotational movement N) the segment 18 is pivoted in the direction X relative to the screening gap 63. This is done continuously until the position illustrated in FIG. 16 (corresponding to FIG. 13a) has been reached as a closed position in the zone of action. Subsequently, a corresponding return stroke H' according to FIG. 16 to the initial position according to FIG. 14 takes place. This adjusting movement described in connection with the individual segment 18 in the form of a phase adjustment is carried out in the longitudinal direction of the roller bodies 55, 56 simultaneously on both of them so that, in this way, the zones of action W' also travel with the narrowed shearing zones 15 in the longitudinal direction (arrow V, FIG. 11) or in the axial direction. Also, the pivot movements of the neighboring roller bodies 55, 56 are oppositely oriented in accordance with H and H' (arrow X', FIG. 14) so that this action correlation forms the radial and axial wear components with the forced cleaning action Z acting like a peeling process. The FIGS. 15 and 17 show the geometric conditions within the screening gap 63 defining for the forced cleaning action the respective zones of action W'.

Figure 18:
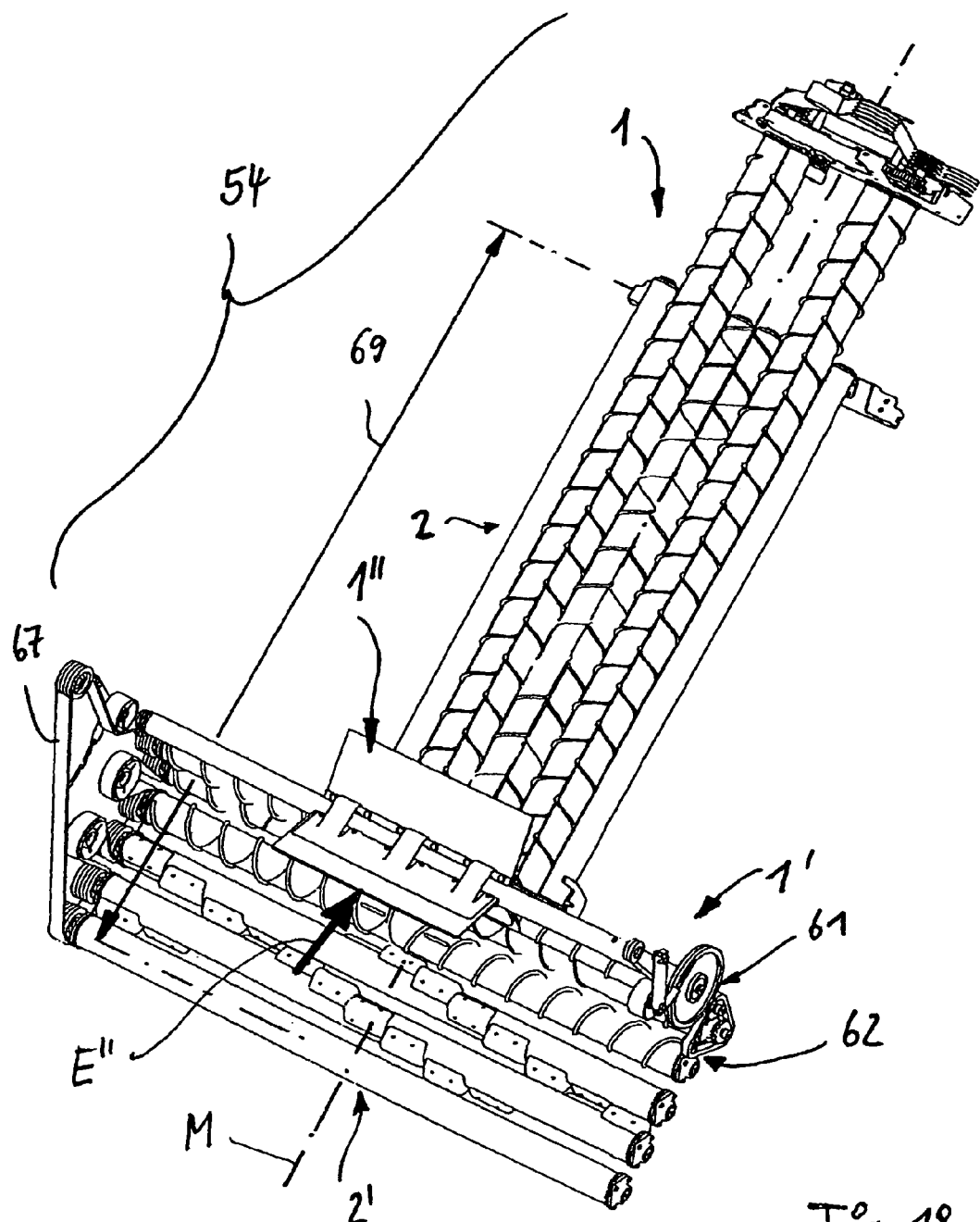
FIG. 18 is a perspective overview of a third embodiment of a conveying and separating device with transverse roller table and axial roller table as an assembly.

In FIG. 18 a further concept of a device, referenced as a whole by 54, is shown wherein a total separating stretch 69 is comprised of partial areas 2 and 2' of the axial roller table 1 and of the transverse roller table 1'. In this connection, as a removal conveyor 62 between the two partial sections 2, 2' there is provided a separating and conveying device 1" that receives the conveyed goods E" from the stretch 2' and effects a vertical deflection U (FIGS. 20 to 25).

Figure 19:
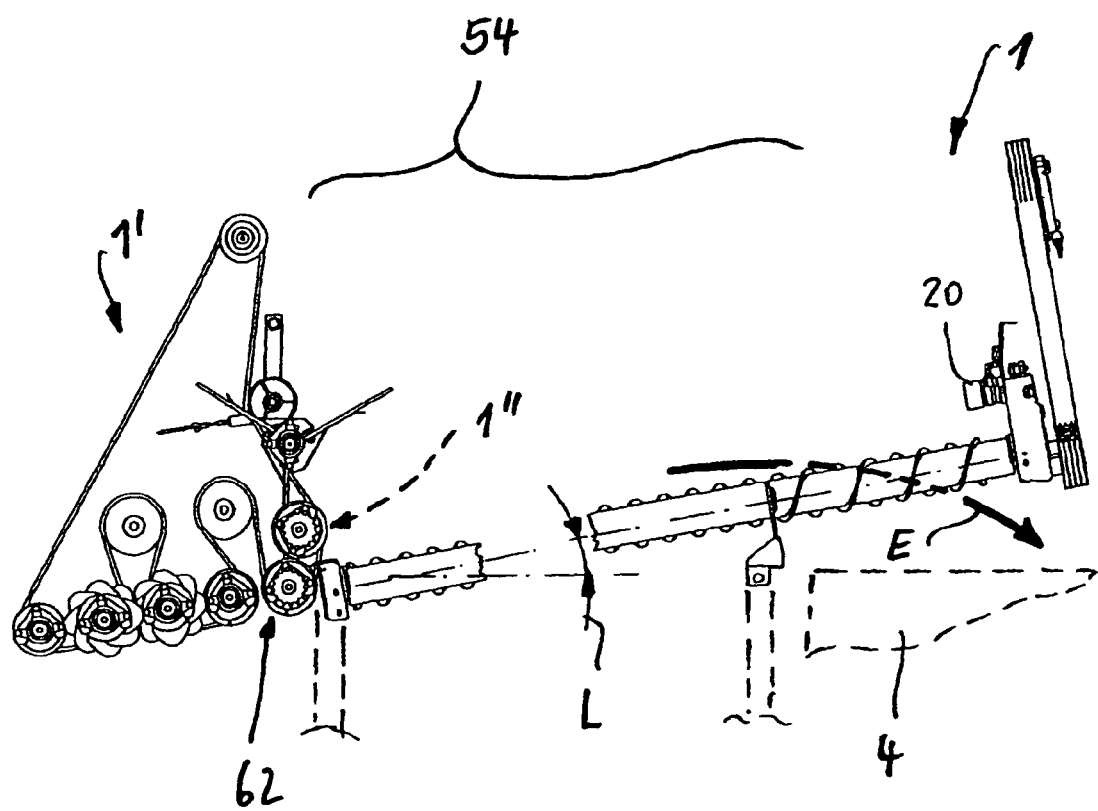
FIG. 19 is a side view of the component according to FIG. 18.

In FIG. 19, this combination system 54 is illustrated in a side view wherein it becomes apparent that the axial roller table 1 also forms a conveying stretch that is positioned at a slant L that conveys the conveyed goods E onto the removal device 4.

In the illustrations according to FIG. 20 to 22 the separating and conveying device 1" is illustrated as an autonomous assembly that, for example, receives a stream of harvested crop E" supplied by the section 2' (FIG. 21) and conveys it farther with vertical deflection U by a vertical spacing 74. In this movement phase, the harvested crop E" is engaged by a roller 76 provided with an entrainment screw 75, 75', respectively, and in the central area of the device 1" is deflected by means of guiding elements 77 into the removal direction (FIG. 22). In this conveying phase, the cleaning roller 76 interacts with smooth rollers 78 that define the end area of this conveying stretch 2' and that are arranged spaced from one another; these rollers 78 circulate in the same rotational direction 80 opposite to the rotational direction 79 of the roller 76.

Figure 23:
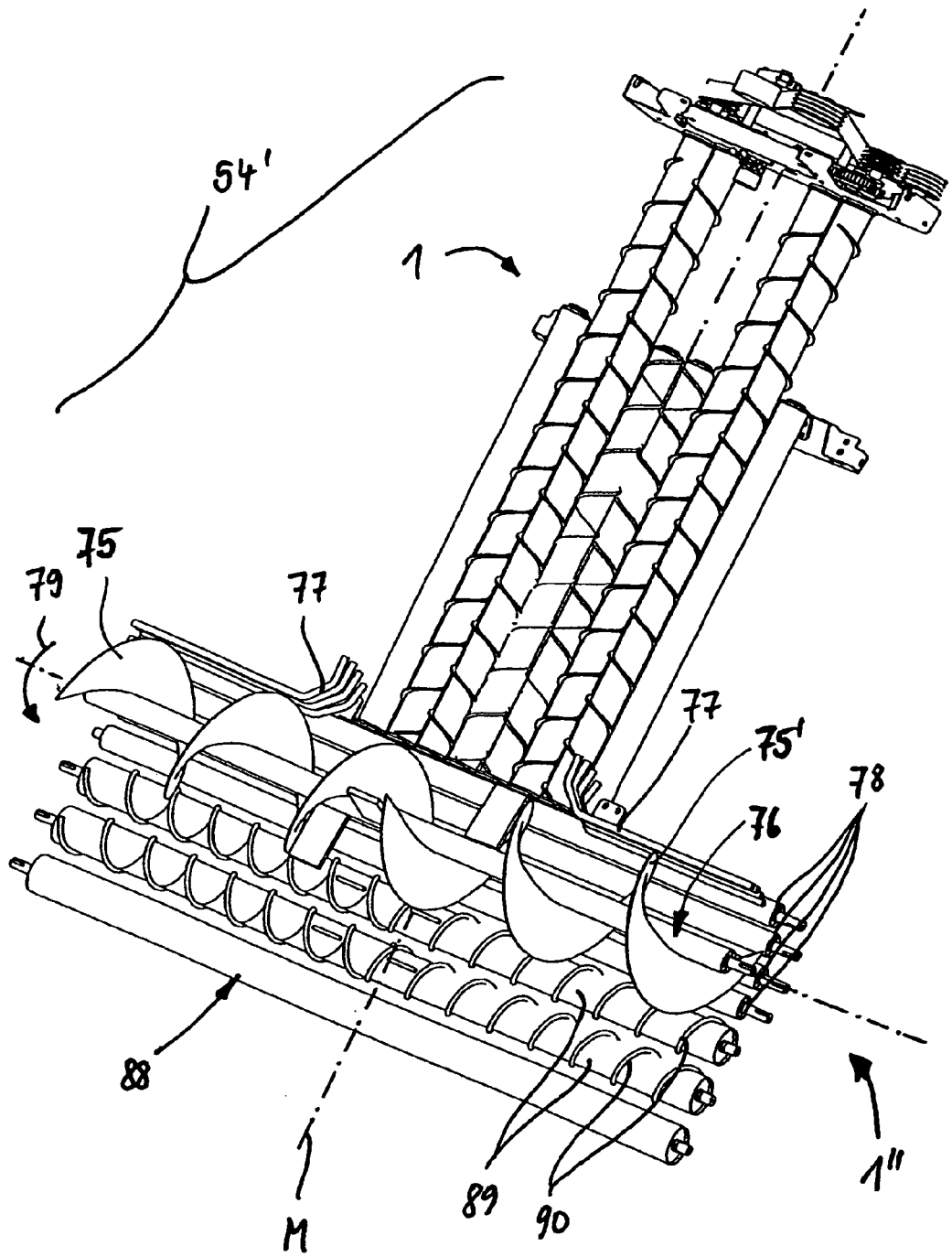
FIG. 23 is a perspective illustration of a construction with several separating stretches as well as the device according to FIG. 20.
Figure 24:
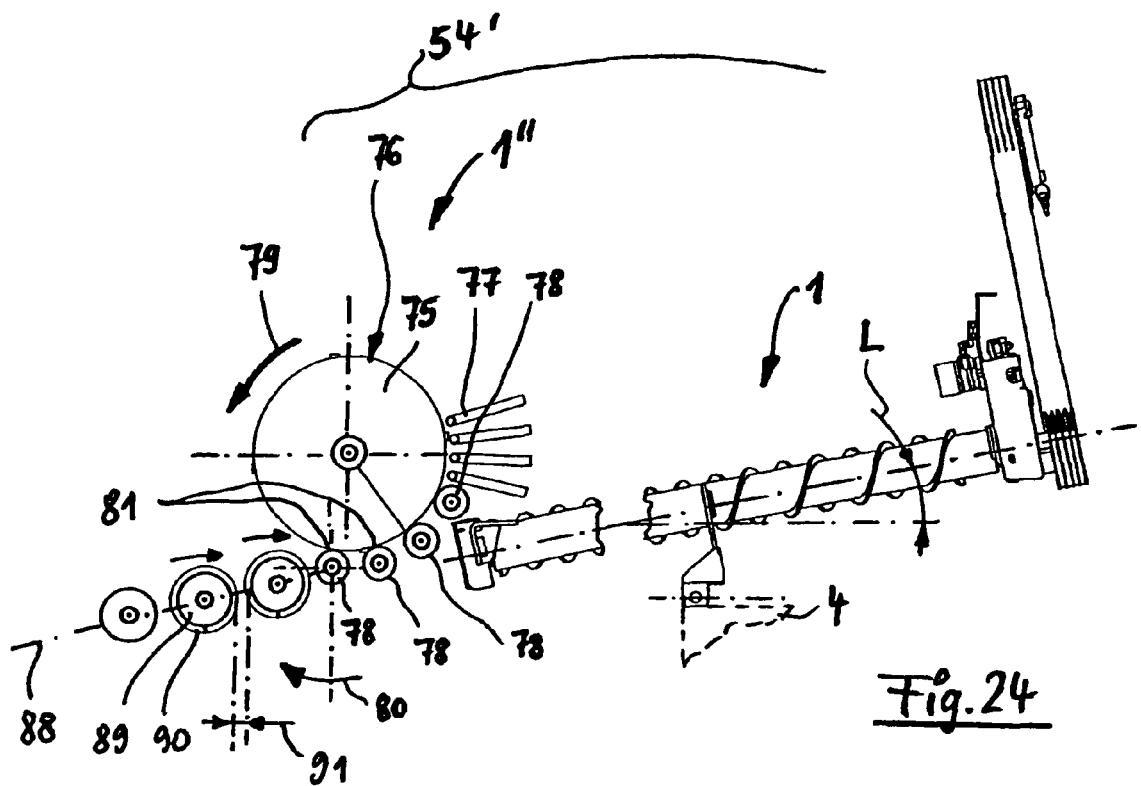
FIG. 24 is a side view of the device according to FIG. 23.
Figure 25:
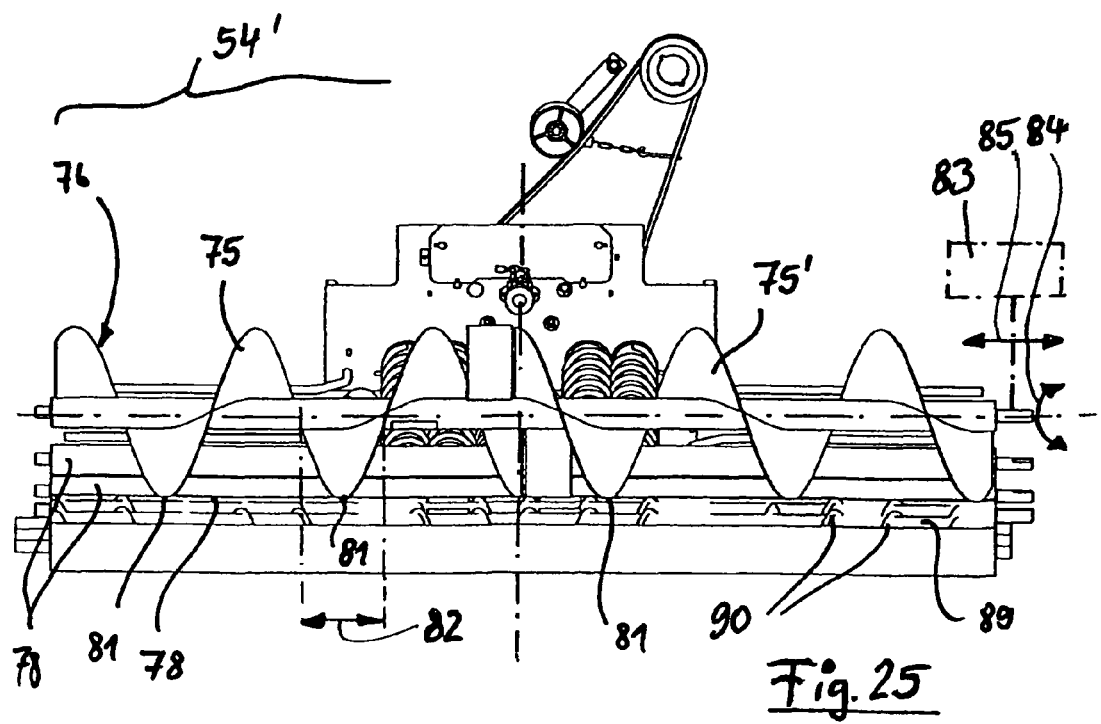
FIG. 25 is a front view of the device according to FIG. 23.
Figure 26:
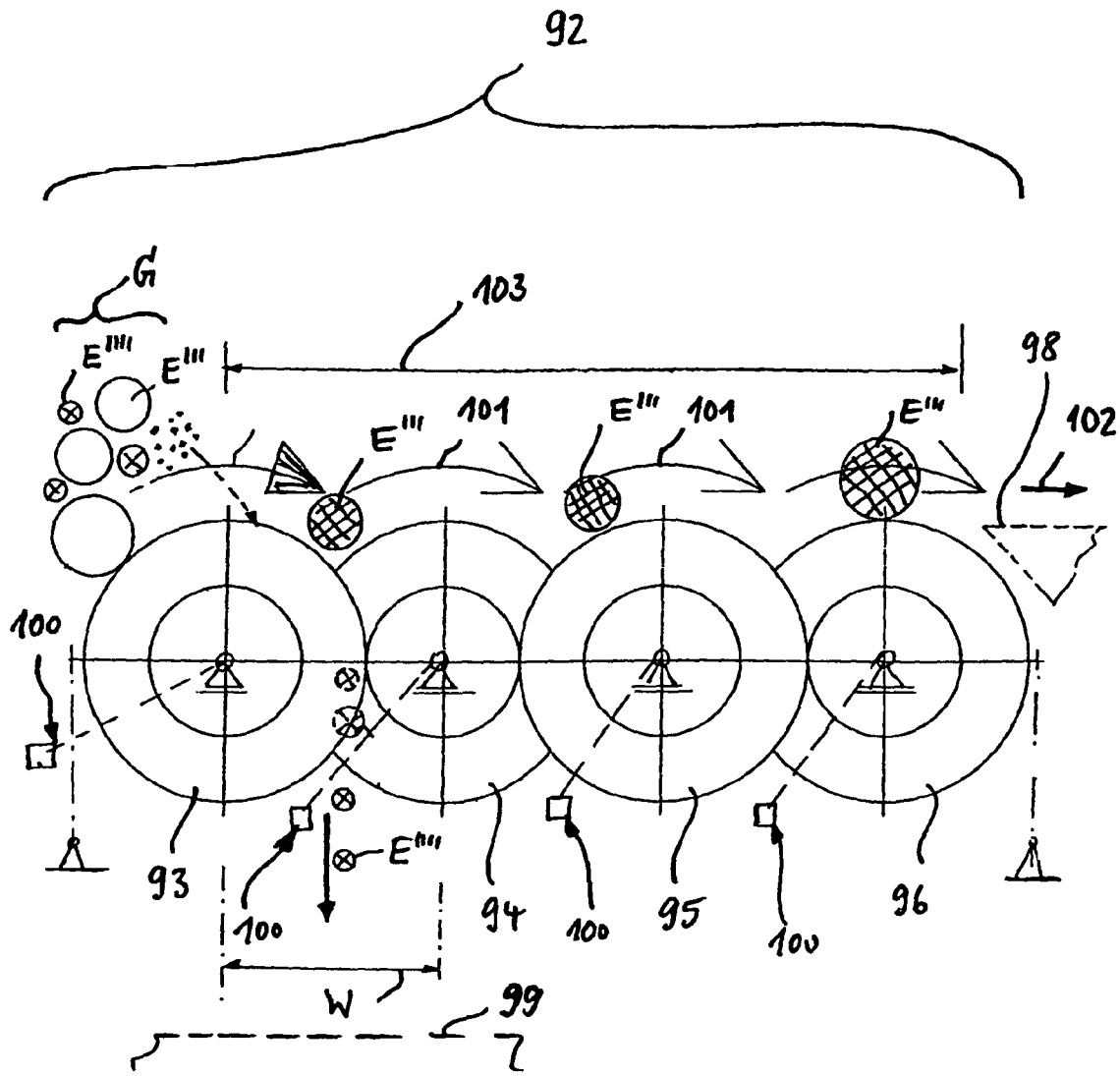
FIG. 26 is an end view of the separating rollers of a separate fractioning device.
Figure 27:
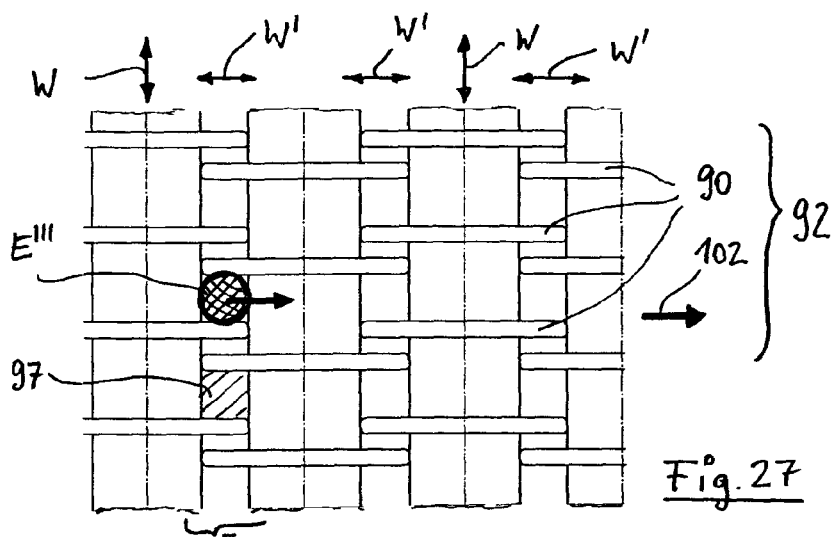
FIG. 27 is a first plan view of a conveying stretch of the fractioning device with four separating rollers according to FIG. 26.

The advantageous application of this separating and conveying device 1" in the machine concept 54 can be taken from the illustrations according to FIGS. 23 to 25 (similar to FIG. 18, without all details being identified with reference numerals). In accordance with the description of the function according to FIGS. 20 to 22 in FIG. 23 it is apparent that the roller 76 circulating in the rotational direction 79 is provided with two screws 75, 75' that have opposite pitch with which a concentrated transport of the conveyed goods E" in the central area is achieved toward the guiding elements 77.

In this device 1", the principle of the forced cleaning action Z already described in connection with the embodiments of the devices 1 and 1' is also realized wherein in this connection in particular by means of the screws 75, 75' having a wide pitch (in comparison to the entrainment profiles 8, 8') a forced cleaning action like a peeling process is realized at the respective contact points 81 with the smooth rollers 78 (FIGS. 24, 25). A complete forced cleaning action coverage of the smooth rollers 78 can be achieved already in that the individual rollers each have different rotary speeds or circumferential speeds relative to the roller 76 so that the contact points 81 that effect the forced cleaning action travel axially about the outer circumference of each smooth roller 78 (arrow 82, FIG. 25) so that they are cleaned across their entire length. Also, it is conceivable that the roller 76 is provided with an additional drive 83 (FIG. 25, shown schematically) with which a radial phase adjustment 84 and/or an axial pushing adjustment 85 can be performed such that a complete cleaning action about the entire circumference of the smooth rollers 78 is achieved and in this way this area of the cleaning stretch can be kept clean without auxiliary means.

An expansion of this forced cleaning action concept in the area of the smooth rollers 78 and the roller 76 by means of the entrainment profile in the form of the screws 75 and 75' is conceivable in that parallel to the axis of rotation 86 of the roller 76 (FIG. 20) on a schematically illustrated axis 87 a cleaning roller (not illustrated) that is substantially embodied like the roller 76 (not illustrated) is correlated with the roller 76. This roller or its profile 87' indicated in dash-dotted line can be affected by corresponding axial displacements (arrow 85') or radial phase adjustment (arrow 84') in such a way that the forced cleaning action, similar to the principle of action of the device 1, can be realized together with the roller 76.

When looking at FIGS. 23 and 24, it is apparent that in front of the separating and conveying device 1" a conveying stretch 88 in known configuration is provided. The transport rollers 89 (with spiral entrainment means 90) have the usual screening gap 91 that does not provide a forced cleaning action. By means of this conveying stretch 88 it becomes apparent that the devices 1, 1', and 1" that each have a forced cleaning action can be combined with a variety of further assemblies and conveying systems.

By means of all described devices 1, 1', 1" or complex assemblies 54, 54', constructive modifications are disclosed in which the new method for separation of crop and admixtures can be realized with separating rollers that have an immediate self-cleaning action. Even though it is known from many known solutions mentioned above to place a mixture of root crop with admixed stones, clods, and like admixed parts onto separating stretches with separating rollers, wherein at least some of the admixed parts are removed through the screening gap and on the topside the crop is conveyed, none of the discussed known solutions show separating rollers that during the separating process can be cleaned immediately or directly and completely or can be kept free of deposits of the sticky or adhering admixtures of the harvested material.

By means of the forced cleaning action Z that has been disclosed above with the aid of several embodiments, an efficient method is proposed for agricultural engineering in connection with harvesting that is suitable for almost any type of harvesting device. This method is characterized in that the entrainment profiles of the separating rollers that cooperate with one another in the screening gap are provided, in addition to the two known rotational movements for conveying, with a superimposed relative movement acting as an axial or radial component so that in this way the system is provided with a cleaning phase. The inventive solution provides in the common sorting gap of the separating rollers shearing zones in which the profiles engaging one another effect the forced cleaning action. This controllable cleaning process is thus integrated as a mechanical abrasive system into the actual conveying and separating process for the mixture.

This forced cleaning action Z by means of corresponding friction, peeling and shearing forces acting on the circumference of the separating rollers is realized by meshing profiles subjected to a (relative) axial and/or radial advancement wherein this advancing component can be introduced by different constructive solutions into the system or its control. It is conceivable in this connection to integrate substantially any type of adjusting, pivoting and/or pushing drives into the system in such a way that the forced cleaning action Z is activated, if needed only for a short cleaning phase.

In FIGS. 26 to 30 the application of the conveying and separating device according to the invention in the form of a separate fractioning unit 92 for sorting particularly potatoes contained in the mixture G (harvested goods E''', E'''') wherein the potatoes in accordance with their size are moved on the cleaning stretch 103 toward a removal location 98 and are supplied in smaller quantities to a lower support 99.

In the case of this fractioning unit 92 integrated into a sorting device, an optimization of the sorting process in the area of the screening gap 5 is realized based on the adjusting possibilities (disclosed already for the afore described forced cleaning action Z) in the area of the respective rotational and/or pushing assemblies 100. In this connection, the passage 97 (FIG. 27, crosshatched surface area) in the screening gap 5 that can be variably adjusted by corresponding adjustment in the axial direction W or radial direction W' between a minimal passage size (FIG. 27) and a maximum passage size (FIG. 29) to the desired sorting task so that sorting in accordance with the size of the potatoes E''' (moved farther in accordance with the arrows 101, 102) and E'''' (drop through the gap 5). The adjusting possibilities W, W' can be realized on disk-shaped separating elements 90 as well as helically extending separating elements 90'.

Figure 28:
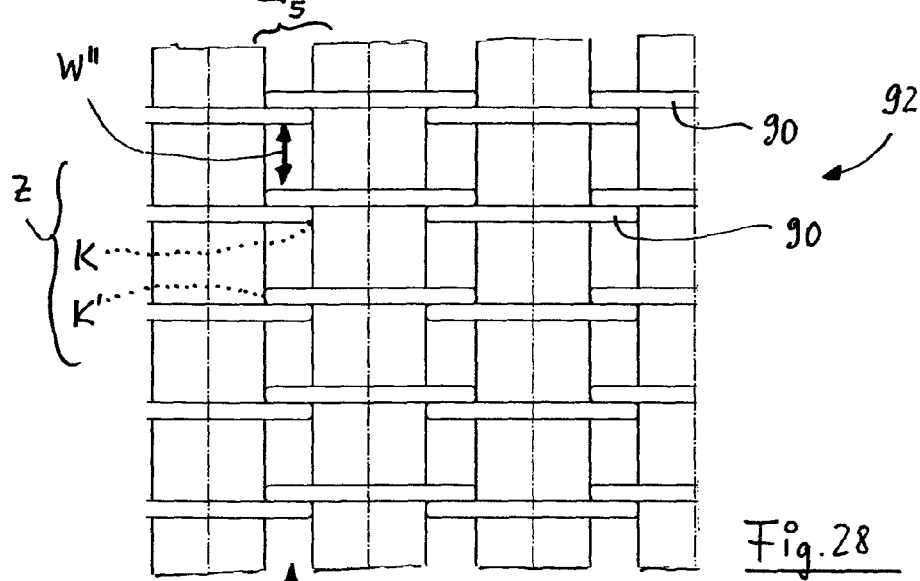
FIG. 28 is a second plan view of a conveying stretch of the fractioning device with four separating rollers according to FIG. 26.
Figure 29:
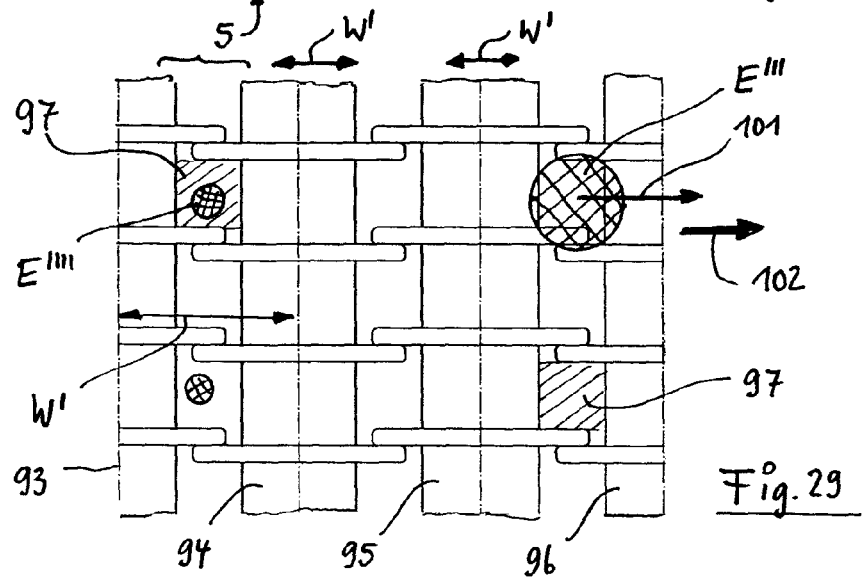
FIG. 29 is a third plan view of a conveying stretch of the fractioning device with four separating rollers according to FIG. 26.
Figure 30:
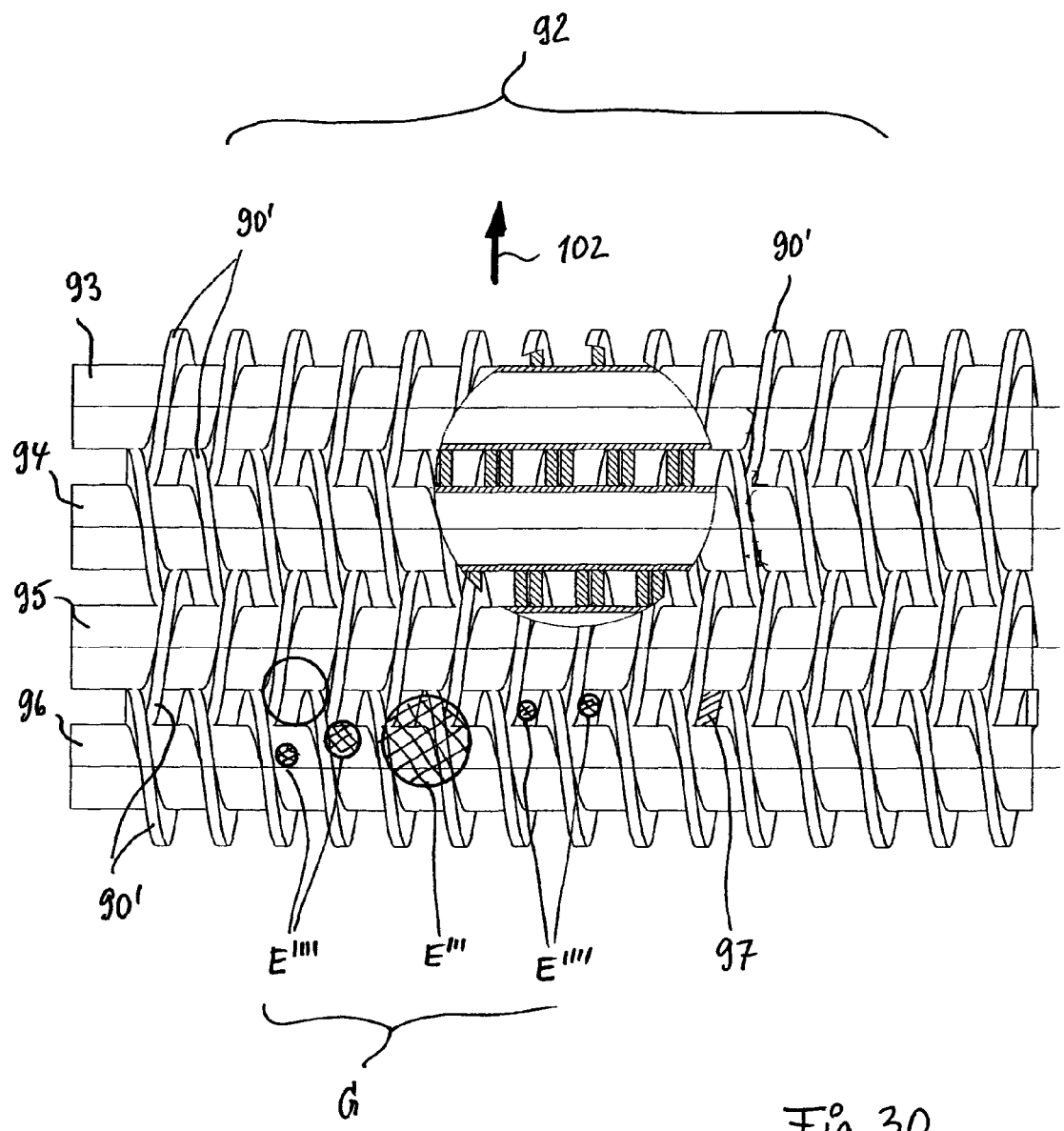
FIG. 30 is a plan view similar to FIG. 27 with modified entrainment profile in the area of the separating rollers.

In FIG. 28, the arrow W'' indicates the axial movement upon forced cleaning action of the system wherein cleaning of the separating rollers 93, 94, 95, 96 is realized in the areas K, K'.

The specification incorporates by reference the entire disclosure of German priority document 10 2007 050 090.6 having a filing date of Oct. 19, 2007.

While specific embodiments of the invention have been shown and described in detail to illustrate the inventive principles, it will be understood that the invention may be embodied otherwise without departing from such principles.

What is claimed is:

1. A conveying and separating device for root crop, the device comprising:
    a separating stretch comprising at least two rotatingly driven separating rollers, wherein the separating stretch receives a harvested material comprising root crop and admixed parts and wherein the at least two separating rollers transport on a topside of the separating stretch primarily the root crop while the admixed parts are removed in a screening phase by means of a screening gap between the at least two separating rollers;
    wherein, by a direct forced cleaning action, the at least two separating rollers are kept free at least of admixed parts that can adhere to the at least two separating rollers;
    wherein the at least two separating rollers are roller bodies provided with circumferential entrainment profiles;
    wherein the roller bodies interact with one another in a paired arrangement and are driven in rotation to effect transport and separation of the mixture;
    wherein the roller bodies are spaced at a spacing from each other and the spacing defines a screening gap between the roller bodies of the paired arrangement;
    wherein the roller bodies interact to provide the forced cleaning action in the screening gap;
    at least one actuator acting on the roller bodies;
    wherein the roller bodies, in addition to being driven in rotation, are acted on by the at least one actuator to generate a radial phase adjustment of the roller bodies relative to each other in that one of the roller bodies is rotated about a pivot angle relative to the other roller body of the paired arrangement and/or an axial movement of the roller bodies relative to each other so that the entrainment profiles of the paired arrangement carry out an axial and/or radial displacement relative to each other and create at least one cleaning gap with adjustable shearing zones in the screening gap to effect the forced cleaning action.

2. The device according to claim 1, wherein the forced cleaning action is performed permanently in a screening phase of the device.

3. The device according to claim 1, wherein the admixed parts between the paired arrangement, respectively, adhering to or tending to adhere to the roller bodies are acted on by the forced cleaning action.

4. The device according to claim 1, wherein in the screening gap between the roller bodies simultaneously a forced cleaning phase of the forced cleaning action and a screening phase can be defined by zones of action that are staggered in a conveying direction of the separating stretch.

5. The device according to claim 1, wherein the entrainment profiles of the roller bodies of the paired arrangement mesh with one another so as to generate the force cleaning action in the form of a mechanical action or a peeling action in the shearing zones.

6. The device according to claim 1, wherein the axial movement and/or a radial phase adjustment of the roller bodies relative to each other causes the shearing zones to extend across an entire length of the roller bodies and to extend completely circumferentially in a radial direction.

7. The device according to claim 1, wherein, in the area of the entrainment profiles acting as continuous cleaning members, the admixed parts reaching the at least one cleaning gap are stripped off the contour of the entrainment profiles and off the circumferential surface of the roller bodies.

8. The device according to claim 1, wherein the entrainment profiles generate variably adjustable cleaning gaps based on at least one of a geometry, an arrangement, and a contour of the entrainment profiles.

9. The device according to claim 1, wherein the entrainment profiles extend helically about a circumference of the roller bodies, respectively.

10. The device according to claim 9, wherein the entrainment profiles of neighboring ones of the roller bodies have oppositely oriented pitch.

11. The device according to claim 9, wherein the rollerbodies and the entrainment profiles form a monolithic part, respectively.

12. The device according to claim 9, wherein the entrainment profiles are comprised of segments.

13. The device according to claim 1, wherein the entrainment profiles are finger profiles axially spaced apart on the roller bodies, respectively.

14. The device according to claim 1, comprising:
a conveying drive driving the roller bodies;
at least one actuator arranged in an area of the at least two separating rollers, wherein the at least one actuator acts on roller bodies to cause the axial and/or radial displacement of the entrainment profiles.

15. The device according to claim 14, wherein the conveying drive and the at least one actuator are simultaneously operative so that on the paired arrangement the forced cleaning action is activated in the area of the entrainment profiles.

16. The device according to claim 14, wherein several of the at least one actuator are provided.

17. The device according to claim 16, wherein a first one of said several actuators is an axial actuator and a second one of said several actuators is a radial actuator, wherein said conveying device and said radial and axial actuators are active simultaneously.

18. The device according to claim 14, further comprising a gear connection connected to the at least one actuator, wherein the at least one actuator is a common actuator for several of the paired arrangements through the gear connection, wherein the entrainment profiles of the paired arrangements are subjected to at least one of a pivot movement and a push movement by the common actuator in order to effect the forced cleaning action.

19. The device according to claim 18, wherein the at least one actuator and the gear connection are provided at ends of the roller bodies.

20. The device according to claim 1, wherein the at least two separating rollers form an axial roller table, wherein a conveying direction is parallel to an axial orientation of the at least two separating rollers.

21. The device according to claim 20, wherein the axial roller table has a longitudinal center plane, wherein several of the paired arrangements are arranged symmetrical to the longitudinal center plane such that the longitudinal center plane divides a first one of the paired arrangements and a second one of the paired arrangements is arranged adjacent to the first paired arrangement on a first side of the longitudinal center plane and a third one of the paired arrangements is arranged adjacent to the first paired arrangement on a second side of the longitudinal center plane.

22. The device according to claim 21, wherein between the first and second paired arrangements and the first and third paired arrangements additional screening gaps are provided.

23. The device according to claim 21, further comprising smooth rollers correlated with the second and third paired arrangements and arranged at a side remote from the first paired arrangement, respectively.

24. The device according to claim 21, further comprising;
at least one actuator arranged at a first end of the first, second and third paired arrangements for causing the axial and/or radial displacement of the first, second and third paired arrangements;
gear drives acting directly on the second and third paired arrangements and arranged in the area of the at least one actuator;
an auxiliary drive having a linkage assembly connectable to the gear drives.

25. The device according to claim 24, further comprising two gear sets arranged at a second end opposite the first end and connecting the first, second, and third paired arrangements, wherein the gear sets are mirror-symmetrical to the longitudinal center plane.

26. The device according to claim 25, further comprising smooth rollers correlated with the second and third paired arrangements at a side remote from the first paired arrangement, respectively, wherein the smooth rollers are driven by the gear sets.

27. The device according to claim 24, further comprising a belt drive as a conveying drive, wherein the gear drives are connected to the belt drive and are moved in synchronized movement by the belt drive.

28. The device according to claim 24, wherein the auxiliary drive is a motor, wherein the motor is connected by a crank to the linkage assembly, wherein the motor is supported centrally in the area of the longitudinal center plane on a machine frame of the device, wherein at an end of the crank remote from the motor a deflection lever is pivotably attached and cooperates with a pushrod connected to the gear drives.

29. The device according to claim 28, wherein the gear drives are provided for pivoting the roller bodies of the paired arrangements relative to each other and comprise drive gears connected to the paired arrangements as well as adjusting gears engaging the drive gears and moveable in an arc shape about the drive gears, wherein the pushrod is pivotably connected to the adjusting gears, wherein a pushing action of the auxiliary drive effects pivoting of the paired arrangements in the same direction, wherein the paired arrangements are driven by the conveying drive in the same direction of rotation.

30. The device according to claim 29, wherein the adjusting gears are connected by a transverse rod, respectively.

31. The device according to claim 29, wherein the adjusting gears are supported pivotably with a vertical lever on axes of the paired arrangements.

32. The device according to claim 1, wherein the at least two separating rollers have an axial orientation transverse to a conveying direction of the mixture and form a transverse roller table.

33. The device according to claim 32, further comprising a conveying drive imparting the same rotational direction in the conveying direction to the at least two separating rollers defining a slanted conveying plane.

34. The device according to claim 33, further comprising a removal device at the downstream end of the conveying stretch.

35. The device according to claim 33, wherein the roller bodies have segments as entrainment profiles.

36. The device according to claim 35, further comprising an auxiliary drive for phase-adjusting the segments that extend helically about the roller bodies, respectively, wherein the auxiliary drive is a lifting member integrated into the conveying drive.

37. The device according to claim 36, wherein the auxiliary drive comprises at least one deflecting roller that is displaceably supported on a machine frame of the device.

38. The device according to claim 33, wherein the conveying drive is a belt drive and has a drive run extending above the at least two separating rollers.

39. The device according to claim 32, further comprising a removal device in the form of a separating and conveying device that receives the conveyed material from the separating stretch and effects a vertical deflection.

40. The device according to claim 1, wherein several of the at least two separating rollers are provided, wherein first ones of said separating rollers form an axial roller table defining a first separating stretch having a conveying direction parallel to an axial orientation of said separating rollers, wherein second ones of said separating rollers have an axial orientation transverse to a conveying direction of the mixture and form a transverse roller table with a second separating stretch, wherein between the axial and transverse roller tables a transfer of the harvested mixture is effected by a removal device in the form of a separating and conveying device that receives the harvested material and effects a vertical deflection.

41. The device according to claim 1 as a fractioning device for sorting root crop.

42. The device according to claim 41, wherein the screening gap of the at least two separating rollers is adjustable with regard to different root crop sizes and also with regard to the effect of the forced cleaning action.

43. A method for separating root crop from a harvested mixture, the method comprising the steps of:

feeding the mixture onto a separating stretch comprised of at least two rotatingly driven separating rollers that are roller bodies provided with circumferential entrainment profiles;

screening the harvested mixture by removing admixed parts from the root crop in a screening phase through a screening gap between the roller bodies that interact with one another in a paired arrangement and are driven in rotation to effect transport and separation of the root crop on the topside of the roller bodies;

cleaning directly the screening gap by a forced cleaning action provided by interaction of the roller bodies with each other at least during the screening phase, wherein the roller bodies, in addition to being driven in rotation, are acted on by at least one actuator generating for the forced cleaning action a radial phase adjustment of the roller bodies relative to each other in that one of the roller bodies is rotated about a pivot angle relative to the other roller body of the paired arrangement and/or an axial movement of the roller bodies relative to each other so that the entrainment profiles of the paired arrangement are subjected to an axial and/or radial displacement relative to each other and create at least one cleaning gap with adjustable shearing zones in the screening gap to effect the forced cleaning action.

44. The method according to claim 43, wherein the axial and/or radial displacement causes friction, peeling and shearing phases on the circumference of the at least two separating rollers and the entrainment profiles.

45. The method according to claim 43, wherein the at least one actuator is activated temporally.

* * * * *